United States Patent
Akiyama et al.

(10) Patent No.: US 9,813,593 B2
(45) Date of Patent: Nov. 7, 2017

(54) OUTSIDE RECOGNITION APPARATUS AND LENS DIRTINESS DETECTION METHOD

(71) Applicant: Clarion Co., Ltd., Saitama-shi, Saitama (JP)

(72) Inventors: Yasuhiro Akiyama, Tokyo (JP); Katsuyuki Nakamura, Tokyo (JP); Kota Irie, Saitama (JP)

(73) Assignee: Clarion Co., Ltd., Saitama-shi (JP)

( * ) Notice: Subject to any disclaimer, the term of this patent is extended or adjusted under 35 U.S.C. 154(b) by 0 days.

(21) Appl. No.: 14/906,969

(22) PCT Filed: Jun. 5, 2014

(86) PCT No.: PCT/JP2014/064986
§ 371 (c)(1),
(2) Date: Jan. 22, 2016

(87) PCT Pub. No.: WO2015/011998
PCT Pub. Date: Jan. 29, 2015

(65) Prior Publication Data
US 2016/0165101 A1    Jun. 9, 2016

(30) Foreign Application Priority Data
Jul. 26, 2013  (JP) .................................. 2013-155552

(51) Int. Cl.
*H04N 5/217*    (2011.01)
*H04N 5/232*    (2006.01)
(Continued)

(52) U.S. Cl.
CPC .............. *H04N 5/217* (2013.01); *G06T 7/42* (2017.01); *H04N 5/23229* (2013.01);
(Continued)

(58) Field of Classification Search
None
See application file for complete search history.

(56) References Cited

U.S. PATENT DOCUMENTS

| | | | | |
|---|---|---|---|---|
| 5,923,027 A | * | 7/1999 | Stam | B60S 1/0822 15/DIG. 15 |
| 6,555,804 B1 | * | 4/2003 | Blasing | B60S 1/0822 250/208.1 |

(Continued)

FOREIGN PATENT DOCUMENTS

| | | | | |
|---|---|---|---|---|
| GB | WO 2010038223 A1 | * | 4/2010 | ............. G06T 7/001 |
| JP | 2001-153969 A | | 6/2001 | |

(Continued)

OTHER PUBLICATIONS

International Search Report (PCT/ISA/210) issued in PCT Application No. PCT/JP2014/064986 dated Sep. 9, 2014, with English translation (four (4) pages).

(Continued)

*Primary Examiner* — Justin P Misleh
(74) *Attorney, Agent, or Firm* — Crowell & Moring LLP

(57) ABSTRACT

It is possible to consider an image as a composite wave that is the result of layering waves having differing periods and amplitudes. An image captured via a lens having a water droplet attached thereto has a higher occurrence of changes such as image blur than an image that does not have a water droplet attached thereto, which means that this type of change in an image results in changes in the composite wave thereof as well. Provided is a lens dirtiness detection device that suitably determines whether a lens is dirty without being affected by a background image by: focusing on the occurrence of large changes in the composite wave of an image that accompany an increase in the dirtiness of a camera lens; extracting each of the image frequency components that (Continued)

constitute the composite wave; and analyzing changes in the magnitude relation between the frequency components.

10 Claims, 21 Drawing Sheets

(51) Int. Cl.
    *G06T 7/42*     (2017.01)
    *B60S 1/08*     (2006.01)
    *B60R 11/04*     (2006.01)

(52) U.S. Cl.
    CPC ............ *B60R 11/04* (2013.01); *B60S 1/0844* (2013.01); *G06T 2207/20048* (2013.01); *G06T 2207/20056* (2013.01); *G06T 2207/30248* (2013.01)

(56) References Cited

U.S. PATENT DOCUMENTS

| | | | |
|---|---|---|---|
| 2003/0069674 A1* | 4/2003 | Stam | B60Q 1/143 701/36 |
| 2005/0254688 A1 | 11/2005 | Franz | |
| 2007/0272884 A1* | 11/2007 | Utida | B60S 1/0822 250/573 |
| 2011/0253917 A1* | 10/2011 | Rothenhaeusler | G02B 27/01 250/578.1 |
| 2014/0300744 A1 | 10/2014 | Kasahara | |
| 2015/0324972 A1* | 11/2015 | Hayakawa | H04N 7/183 348/148 |

FOREIGN PATENT DOCUMENTS

| | | |
|---|---|---|
| JP | 2003-259211 A | 9/2003 |
| JP | 2005-515565 A | 5/2005 |
| JP | 2006-254206 A | 9/2006 |
| JP | 3886573 B2 | 2/2007 |
| JP | 2007-282106 A | 10/2007 |
| JP | 2009-130700 A | 6/2009 |
| JP | 2013-115625 A | 6/2013 |

OTHER PUBLICATIONS

Japanese-language Written Opinion (PCT/ISA/237) issued in PCT Application No. PCT/JP2014/064986 dated Sep. 9, 2014 (six (6) pages).
Extended European Search Report issued in counterpart European Application No. 14828669.3 dated Mar. 8, 2017 (Ten (10) pages).

* cited by examiner

FIG. 2A
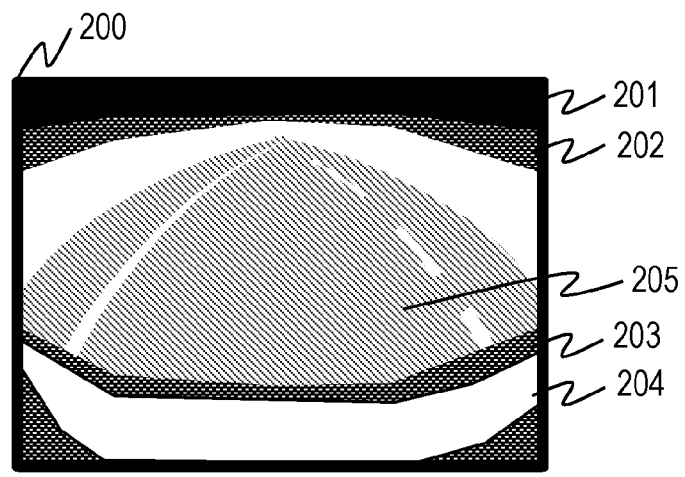
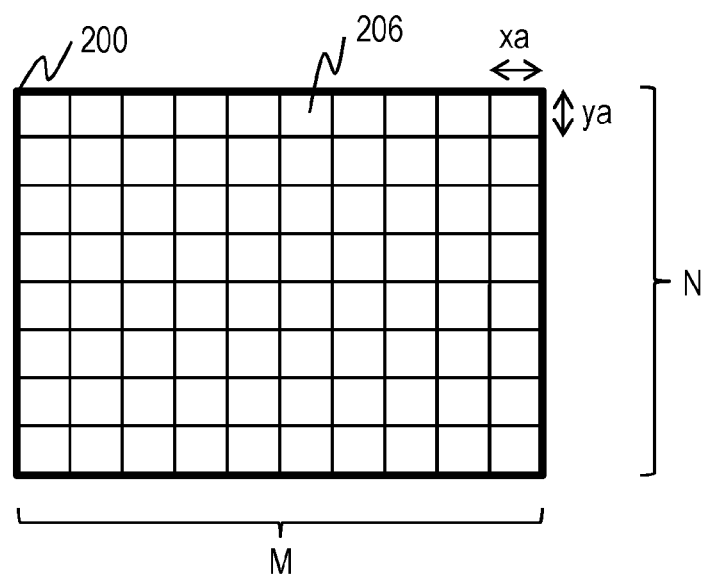
(EXAMPLE) xa=ya=32 PIXELS
M=10, N=8
FIG. 2B

RAINDROP SCORE THRESHOLD OF SAMPLE BLOCK

RAINDROP SCORE THRESHOLD FOR ENTIRE IMAGE

TOTAL RAINDROP SCORE = 32

RAINDROP IS PRESENT

RAINDROP SCORE THRESHOLD FOR IMAGE DIVIDED REGION

| 7 |

|   | TOTAL RAINDROP SCORE (1101) | JUDGMENT (1102) |
|---|---|---|
| A | 4 | 0 |
| B | 8 | 1 |
| C | 8 | 1 |
| D | 8 | 1 |
| E | 4 | 0 |

0= NO RAINDROP IS PRESENT
1= RAINDROP IS PRESENT (EXAMPLE) xa=ya=64 PIXELS (EXAMPLE) xb=yb=32 PIXELS (EXAMPLE OF CALCULATION FOR AVERAGE FREQUENCY POWER USING ANALYSIS RESULTS OF SURROUNDING REGIONS)
AVERAGE FREQUENCY POWER OF a = = $(a \times K1) + ((b+c+d+e+f+g+h+i) \times K2)$
  WHERE a to i ARE AVERAGE FREQUENCY POWER FOR EACH DIVIDED REGION
    K1=0.7, K2=0.375

(EXAMPLE) xa=ya=64 PIXELS (EXAMPLE) xb=yb=32 PIXELS

NORMALIZED SAD OBSERVATION POINTS
(EXAMPLE) 8X8 PIXELS PER IMAGE OBSERVATION POINT

FIG. 19A
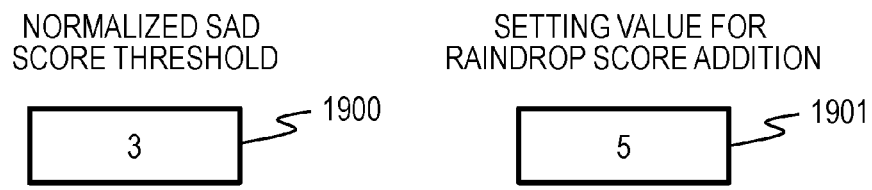
FIG. 19B
| TIME (IMAGE INPUT TIME) | t1 | t2 | t3 | t4 | t5 | t6 | t7 | t8 |
|---|---|---|---|---|---|---|---|---|
| 1902 — TOTAL RAINDROP SCORE OF NORMALIZED SAD OBSERVATION POINTS | 1 | 0 | 2 | 0 | 3 | 4 | 5 | 4 |
| 1903 — RAINDROP SCORE ADDITIONAL VALUE | 0 | 0 | 0 | 0 | 5 | 5 | 5 | 5 |
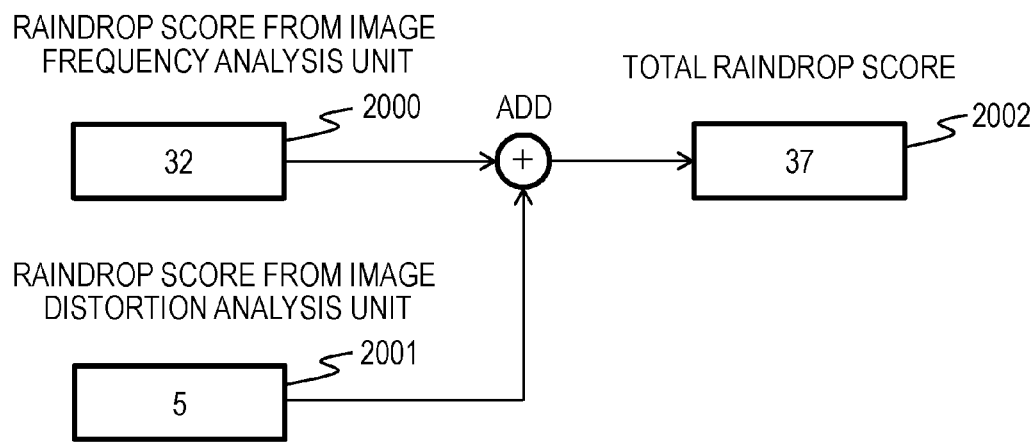
Fig. 20

OUTSIDE RECOGNITION APPARATUS AND LENS DIRTINESS DETECTION METHOD

CLAIM OF PRIORITY

The present application claims priority from Japanese patent application JP2013-155552 filed on Jul. 26, 2013, the content of which is hereby incorporated by reference into this application.

BACKGROUND

The present invention relates to a system for detecting lens dirtiness of a vehicle-mounted camera or the like.

In order to prevent accidents such as collision between vehicles or collision between a vehicle and a pedestrian, a technology has been developed in which a camera monitors the status of the surrounding areas of the vehicle, and if a potential hazard is detected, the driver is given a warning, and the operation of the vehicle is automatically controlled. In a system in which the camera is mounted outside of a vehicle, a lens of the camera is likely to get dirty due to bad weather, dirt, dust and the like, and in some cases, such a lens dirtiness possibly causes a false warning, which may adversely affect safety. As a solution to this problem, a system to automatically detect lens dirtiness and remove the dirtiness by air or water is commercially available, but such a system is generally expensive. Thus, it is preferable to temporarily stop the recognition operation for the surrounding areas when the lens gets dirty heavily, so that a false warning is prevented and the safety level does not lower unnecessarily.

Patent Document 1, for example, discloses a method to detect a water droplet on the lens surface based on a differential image between a background image and an input image.

[Patent Document 1] Japanese Patent Application Laid-open Publication No. 2006-254206

SUMMARY

Patent Document 1 described above discloses the method to detect a water droplet using a differential image. However, because background can be seen through a water droplet, in some cases, an afterimage of the background image might be recognized as a water droplet (difference due to a change in the background image is detected as a water droplet, or a part of the background image is detected as an edge of the water droplet, for example). Thus, only with the differential image, it is difficult to accurately determine whether a water droplet truly exists or not.

The present invention is aiming at accurately detecting various types of dirtiness including transparent dirtiness such as water droplets on a camera.

An image is regarded as a composite wave made of a plurality of waves with different frequencies and amplitudes (light and shade) overlapping each other. An image with a water droplet (or in other words, an image captured by a lens that has a water droplet thereon) has a change such as image blurring as compared with an image without any droplet. Such a change in the image indicates that there is also a change in the composite wave. The present invention focuses on the fact that the heavier the lens dirtiness (an increase in the amount of water droplet on the lens, for example) on a camera is, the larger the change in the composite wave of the image becomes, and is aiming at detecting presence or absence of lens dirtiness on the camera appropriately by extracting respective image frequency components of the composite wave, and analyzing a change in the size relationship between these frequency components (distribution of the image frequency powers) regardless of a background image.

According to representative embodiments of the present invention, it is possible to accurately detect various types of dirtiness on a camera that include transparent dirtiness such as water droplets.

BRIEF DESCRIPTIONS OF THE DRAWINGS

FIGS. 2A and 2B are diagrams for explaining a region dividing process by an image frequency analysis unit of Embodiment 1 of the present invention.

FIG. 9 is a diagram for explaining an example of an operation of a raindrop region information generation unit of Embodiment 1 of the present invention.

FIGS. 10A and 10B are diagrams for explaining an example of an operation of a raindrop judgment unit of Embodiment 1 of the present invention.

FIGS. 19A and 19B are diagrams for explaining an example of an operation of a third raindrop score calculation unit of Embodiment 4 of the present invention.

FIG. 20 is a diagram for explaining an operation of a raindrop judgment unit in conducting an image distortion analysis in Embodiment 4 of the present invention.

DETAILED DESCRIPTIONS OF EMBODIMENTS

Embodiments of the present invention will be explained below with reference to figures.

Embodiment 1

In this embodiment, an example of a raindrop detection unit 101 included in an outside recognition apparatus 100 will be explained.

Figure 1:
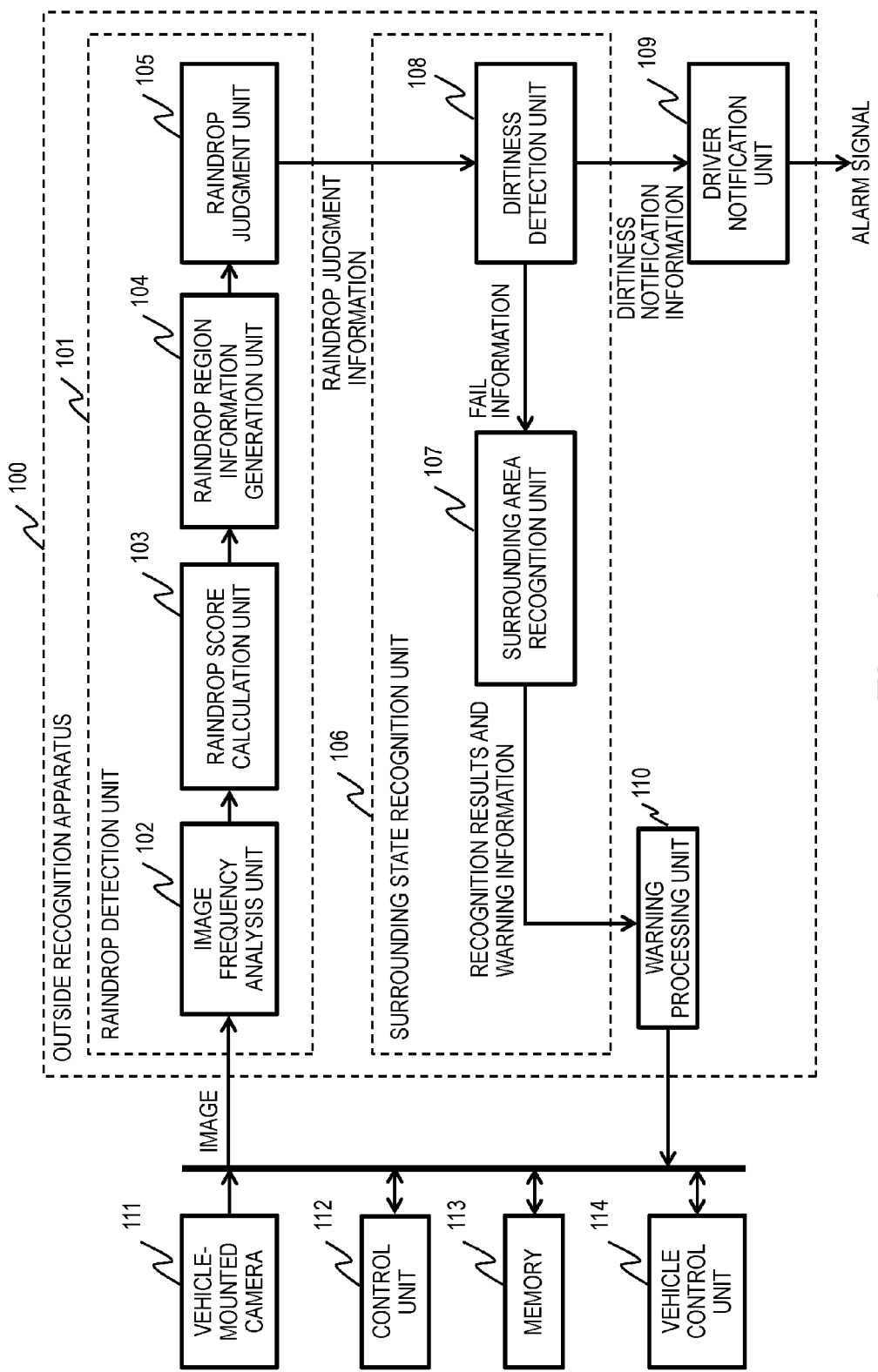
FIG. 1 is a function block diagram showing a configuration example of an outside recognition apparatus of Embodiment 1 of the present invention.

FIG. 1 is a function block diagram showing a configuration example of the outside recognition apparatus 100 of Embodiment 1 of the present invention.

The outside recognition apparatus 100 receives an image signal from a vehicle-mounted camera 111 attached to the body of a vehicle (not shown in the figure), conducts a predetermined image signal process, thereby recognizing the state of the surrounding areas of the vehicle, outputs the recognition result to a control unit of the vehicle, and issues a warning to the driver.

The recognition of the state of the surrounding areas means recognition of presence or absence of other vehicles including motorcycles and bicycles and pedestrians, and presence or absence of obstacles that hinder driving or parking of the vehicle through an analysis of camera images capturing spaces near the vehicle and far from the vehicle. The recognition of the state of the surrounding areas also means predicting a possible collision of the vehicle with another vehicle such as a motorcycle or a bicycle, or a pedestrian present near or far from the vehicle by detecting a sudden approach thereof, and predicting a possible collision of the vehicle with an obstacle.

The outside recognition apparatus 100 includes a raindrop detection unit 101, a surrounding area state recognition unit 106, a warning processing unit 110, and a driver notification unit 109. The outside recognition apparatus 100 may also include a vehicle-mounted camera 111, a control unit 112, and a memory 113. The vehicle-mounted camera 111 captures images of areas surrounding the vehicle. Pixel data for the captured images is temporarily stored in the memory 113 through a signal bus, and is inputted into the raindrop detection unit 101. The control unit 112 controls input and output of images between the vehicle-mounted camera 111 and the raindrop detection unit 101, and input and output of recognition result information and an alarm signal between the outside recognition apparatus 100 and a vehicle controller 114.

The vehicle controller 114 controls the vehicle (steering, decelerating, or stopping, for example) based on the recognition results of the areas surrounding the vehicle provided by the outside recognition apparatus 100.

The raindrop detection unit 101 is a block that presumes presence or absence of a raindrop on a lens surface of the vehicle-mounted camera 111 based on the images inputted from the vehicle-mounted camera 111. The raindrop detection unit 101 includes: an image frequency analysis unit 102 that divides an input image from the vehicle-mounted camera 111 into a predetermined number of regions and that calculates an image frequency for each of the divided regions; a raindrop score calculation unit 103 that calculates, as scores, probabilities of the presence of raindrops based on the calculated image frequencies; a raindrop region information generation unit 104 that creates a raindrop score map of the regions for one image (one frame); and a raindrop judgment unit 105 that outputs raindrop judgment information indicating presence or absence of raindrops on the lens surface for each image based on the raindrop score map.

The surrounding state recognition unit 106 includes a dirtiness detection unit 108 that determines whether a lens surface of the vehicle-mounted camera 111 has dirtiness thereon such as rain, snow, dirt, and lens deposit, a surrounding area recognition unit 107 provided to recognize the status of the areas surrounding the vehicle, and a warning processing unit 110 that sends the recognition result information and an alarm signal outputted from the surrounding area recognition unit 107 to the vehicle controller 114. When the lens surface of the vehicle-mounted camera 111 has dirtiness such as rain, dirt, or lens deposit, the dirtiness detection unit 108 outputs a FAIL signal to the surrounding area recognition unit 107 so as to stop the operation thereof temporarily or continuously because the dirtiness makes it difficult for the surrounding area recognition unit 107 to conduct an image recognition process accurately, which could cause erroneous recognition. The dirtiness detection unit 108 also outputs dirtiness notification information indicating that the surrounding area recognition unit 107 is temporarily or continuously stopped to the driver notification unit 109, which notifies the driver through a separately provided external display unit (see FIG. 23) such as a display.

The raindrop detection unit 101 including the image frequency analysis unit 102 and the like, the surrounding area recognition unit 106 including the dirtiness detection unit 108 and the like, the warning processing unit 110 and the driver notification unit 109 shown in FIG. 1 may be realized by a dedicated logical circuit, or may be realized by programs run by a general-purpose processor. In such a case, the outside recognition apparatus 100 includes at least a control unit 112 and a memory 113. Programs to realize the respective functions described above are loaded to the memory 113, and the control unit 112 (i.e., processor) runs those programs, thereby realizing the respective functions described above. In this case, the processes conducted by the respective units described above in the descriptions below are actually conducted by the control unit 112.

The raindrop detection unit 101 of the present invention may detect various types of dirtiness such as rain, dirt, and lens deposit, but the present embodiment will be described with an example of detecting raindrops.

Below, the raindrop detection unit 101 will be explained.

FIGS. 2A and 2B are diagrams for explaining the region dividing process by the image frequency analysis unit 102 of Embodiment 1 of the present invention.

FIG. 2A is an example of an image 200 captured by a vehicle-mounted camera 111 mounted on the rear bumper of the vehicle. The image shows the rear road state 205 of the vehicle including other vehicles and a rear view, a light-shielding panel 201 integrally formed with the vehicle-mounted camera 111 and provided to block unwanted light such as sunlight, a top edge 202 (finisher) of the body of the vehicle, a bumper 203, and a license plate 204.

FIG. 2B is a diagram showing an example of the region dividing process of the image frequency analysis unit 102. The image frequency analysis unit 102 divides the one-frame image captured by the vehicle-mounted camera 111 into regions of a predetermined image size, and obtains an image frequency for each of the divided regions. FIG. 2B shows an example of dividing the image 200 of 320 (horizontal)×256 (vertical) pixels into 80 (M=10, N=8) regions 206, each of which has a pixel number (xa×ya) of 32×32 pixels.

The mounting position of the vehicle-mounted camera 111 shown in FIG. 2A is an example, and an image captured by the vehicle-mounted camera 111 installed in another position of the vehicle may be inputted into the raindrop detection unit 101.

The input image size, the image size of each of the divided regions, and the number of divided regions are examples, and the image sizes and the number of divided regions may be set to any appropriate values.

Figure 3A:
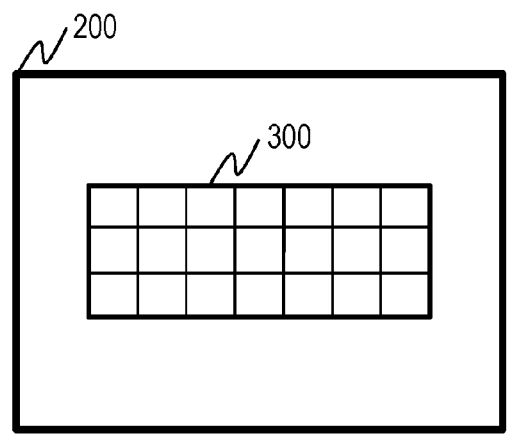
FIGS. 3A-3C are diagrams for explaining another example of the region dividing process by the image frequency analysis unit of Embodiment 1 of the present invention.
Figure 3B:
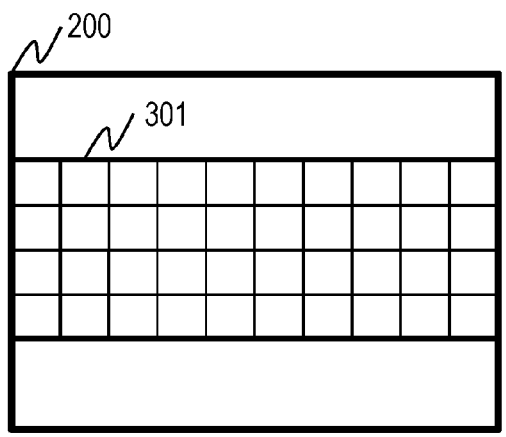
Figure 3C:
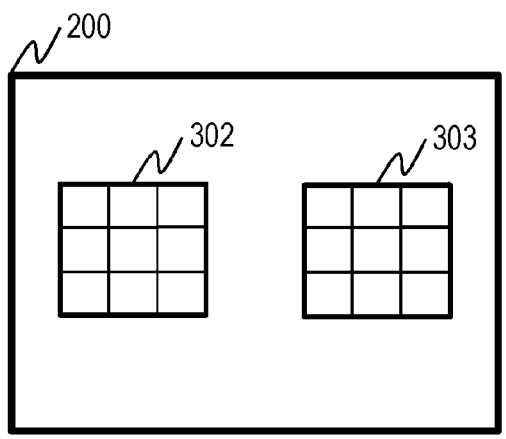

FIGS. 3A-3C are diagrams for explaining another example of the region dividing process of the image frequency analysis unit 102 of Embodiment 1 of the present invention.

Although FIG. 2B shows an example of dividing the entire area of the image 200, it is also possible to limit the raindrop detection region to one part or a plurality of parts of the image depending on the usage purpose of the surrounding area recognition unit 106.

For example, in the example of FIG. 3A, a part in which only the road surface appears is set to the raindrop detection region 300. In the example of FIG. 3B, a part of the vehicle and the light-shielding panel of the vehicle-mounted camera 111 are excluded from the raindrop detection region 300. In the example of FIG. 3C, areas where lines on the road are likely to appear are set to the two raindrop detection regions (302 and 303).

Although FIGS. 2A to 3C illustrate examples of dividing the image into a plurality of regions, it is also possible to have one divided region of a predetermined size in the image.

Figure 4A:
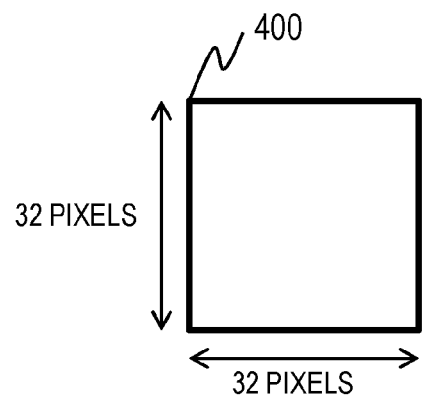
FIGS. 4A-4C are diagrams for explaining the calculation method for mage frequencies by the image frequency analysis unit of Embodiment 1 of the present invention.
Figure 4B:
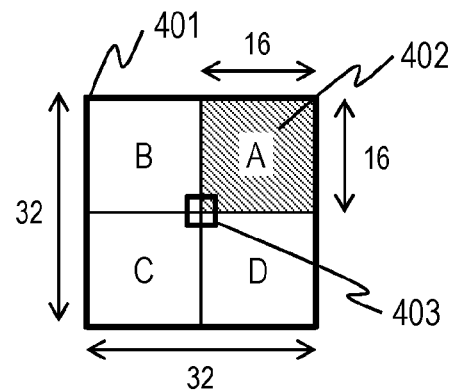
Figure 4C:
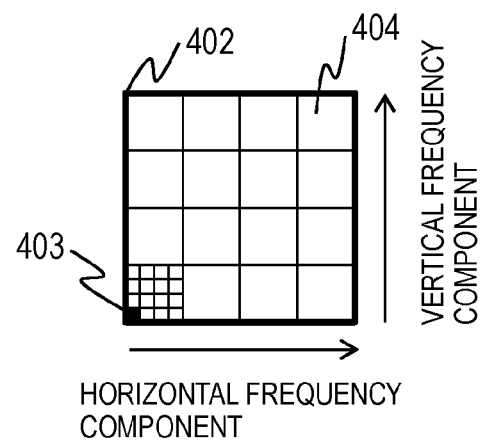

FIGS. 4A-4C are diagrams for explaining the calculation method for the image frequencies by the image frequency analysis unit 102 of Embodiment 1 of the present invention.

The image frequency is calculated using Discrete Fourier Transform (DFT). DFT is a calculation method generally known as a method to convert digital signals (discrete signals) sampled on a predetermined time axis into the frequency spectrum representing the distribution of frequency signals. Below the calculation of image frequency through DFT will be explained.

An image is a composite wave made of a plurality of waves overlapping each other, and DFT can break down the contrast of an input image (pixel values) into frequency components from low frequency to high frequency. The frequency in this explanation means a frequency of a spatial change of the pixel value, and is generally referred to as a spatial frequency or image frequency. Considering an image is made of various density waves of the horizontal direction and vertical direction, the image frequency components obtained through DFT are also in two dimensions, i.e., the horizontal and vertical directions.

In the ideal Fourier conversion, frequency components are obtained by giving image signals that continues indefinitely. However, in the actual signal processing, the function calculation by the indefinite signal input is not realistic, and therefore, DFT of a limited size is conducted on the entire image or a partial region cropped out of the image. The cropped image size is appropriately selected for the region that is to be subjected to the image frequency analysis.

Next, the specific procedures of DFT used in the present embodiment will be explained. DFT of two dimensional data such as an image uses the following Formula 1. By conducting DFT of Formula 1 for the image made of M (horizontal direction)×N (vertical direction) pixels, M (horizontal direction)×N (vertical direction) pieces of image frequency data, or in other words, the image frequency data of the same number as the input pixel number, will be obtained.

[Formula 1]

$$F(k, l) = \sum_{x=0}^{M-1} \sum_{y=0}^{N-1} f(x, y) W_M^{xk} W_N^{yl} \quad \text{(Formula 1)}$$

where the following formulae are satisfied:

[Formula 2]

$$W_M = e^{-j\frac{2\pi}{M}} \quad \text{(Formula 2)}$$

[Formula 3]

$$W_N = e^{-j\frac{2\pi}{N}} \quad \text{(Formula 3)}$$

In the formula, x and y are spatial coordinate values of the image, or in other words, coordinate values that represent the spatial position of respective pixels included in the input image. "x" is a coordinate value showing the position of each pixel in the horizontal direction, and "y" is a coordinate value showing the position of each pixel in the vertical direction.

"k" and "l" are values representing the frequency spatial coordinates. "k" represents the frequency position in the horizontal direction, and "l" represents the frequency position in the vertical direction.

f(x, y) is a function representing the pixel value of the position defined by a horizontal coordinate value x and a vertical coordinate value y in the image.

$W_M^{xk}$ is a factor for extracting the horizontal frequency components for one cycle, which exist in the M pixel signals (discrete signals) in the horizontal direction.

The factor "x" represents the horizontal pixel position (x=0 to M−1), and the factor "k" represents the position of the horizontal frequency component (k=0 to M−1).

$W_M^{yl}$ is a factor for extracting the vertical frequency components for one cycle, which exist in the N pixel signals (discrete signals) in the vertical direction.

The factor "y" represents the vertical pixel position (y=0 to N−1), and the factor "l" represents the position of the vertical frequency component (l=0 to N−1).

F(k, l) is a function representing image frequency data defined by the horizontal coordinate value "k" and the vertical coordinate value "l".

Formula 4 is used to convert the data to frequency power, so that it is easier to compare respective frequency spectra. The unit of the frequency power is dB.

[Formula 4]

$$PF(k,l) = 10 \log_{10}(F(k,l)^2) \quad \text{(Formula 4)}$$

An image having raindrops is known to be blurry as compared to an image having no raindrops. For example, raindrops make edges of the background, other vehicles, and surrounding buildings in the image look blurry or even disappear. The blurry image tends to have a lower image frequency than a non-blurry image. That is, an image having raindrops tends to have a lower image frequency and an image having no raindrops tends to have a higher image frequency. The present invention utilizes this characteristics, and is configured to detect presence or absence of raindrops by analyzing image frequencies.

When DFT calculation is performed on one partial image 400 (32×32 pixels) of divided regions shown in FIG. 4A, four image frequencies 401 of quadrant A, quadrant B, quadrant C, and quadrant D are derived centering on the four pixels 403 that are a DC (direct-current) component of the image as shown in FIG. 4B. Due to the characteristics of the DFT, the image frequencies of quadrant A, quadrant B, quadrant C, and quadrant D are point symmetric with respect to the coordinates of the DC component. That is, because the image frequencies of the quadrant B, quadrant C, and quadrant D can be obtained based on the image frequency of the quadrant A, it is only necessary to refer to the 16×16 pieces of data (will be referred to as a sample block 402) for the quadrant A as the image frequencies. As shown in FIG. 4C, the image frequency data obtained through DFT includes one DC component value on the bottom left and other AC component values 404. The horizontal direction of the image frequency data represents the horizontal frequency component, and the left side is lower frequencies and the right side is the higher frequencies. The vertical direction of the image frequency data represents the vertical frequency component, and the lower side is lower frequencies and the upper side is the higher frequencies.

Figure 5A:
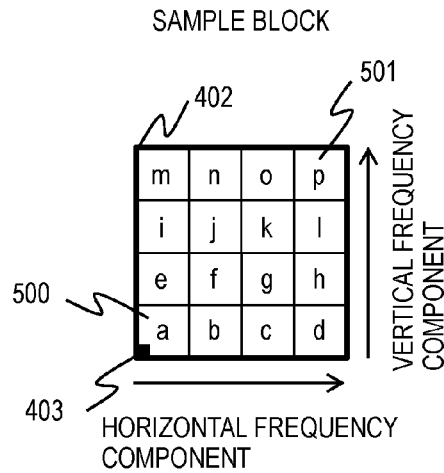
FIGS. 5A-5C are diagrams for explaining an example of a method to calculate an average frequency power by the image frequency analysis unit of Embodiment 1 of the present invention.
Figure 5B:
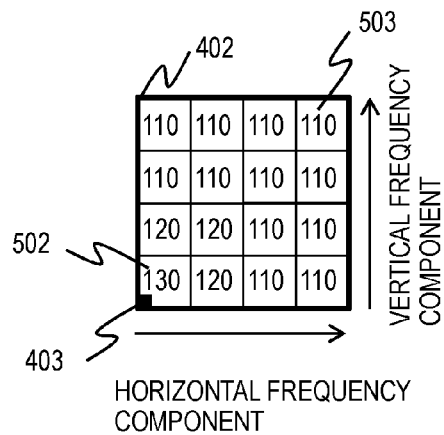
Figure 5C:
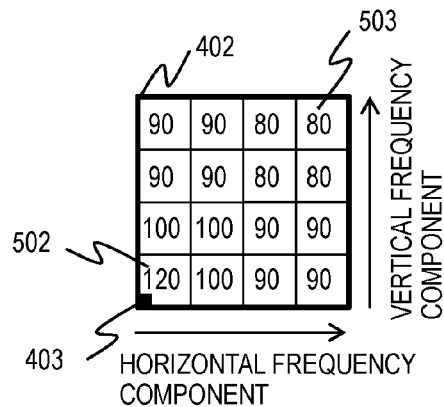

FIGS. 5A-5C are diagrams for explaining an example of a method to calculate the average frequency power by the image frequency analysis unit 102 of Embodiment 1 of the present invention.

As shown in FIG. 5A, in order to obtain the average frequency power, the image frequency analysis unit 102 divides the sample block 402 into 16 sub-blocks (sub-block a500 to sub-block p501). Each sub-block corresponds to a frequency range that includes 4×4 (or 16) frequency spatial coordinates. That is, the frequency power for the 4×4 frequency spatial coordinates is calculated for each sub-block through Formulae 1 to 4. Next, the image frequency analysis unit 102 averages the frequency powers of the 4×4 frequency spatial coordinates of the respective sub-blocks, thereby obtaining the sub-block average frequency power.

FIG. 5B shows an example of the results of the average frequency powers of the respective sub-blocks based on a sample block 402 of the image having no raindrop. The average frequency powers 502 to 503 in FIG. 5B are examples of the average frequency powers obtained for the sub-block a500 to sub-block p501 of the image having no raindrop. In this example, the average frequency power 502 of the sub-block a500 that is a frequency range having the lowest horizontal frequency component and the lowest vertical frequency component is 130, and the average frequency power 503 of the sub-block p501 that is a frequency range having the highest horizontal frequency component and the highest vertical frequency component is 110.

FIG. 5C shows an example of the results of the average frequency powers of the respective sub-blocks based on a sample block 402 of the image having raindrops. The average frequency powers 502 to 503 in FIG. 5C are examples of the average frequency powers obtained for the sub-block a500 to sub-block p501 of the image having raindrops. In this example, the average frequency power 502 of the sub-block a500 is 120, and the average frequency power 503 of the sub-block p501 is 80.

As discussed above, an image having raindrops tends to have a lower image frequency and an image having no raindrops tends to have a higher image frequency. Therefore, generally, if the average frequency powers of the respective frequency ranges of an image captured by the vehicle-mounted camera 111 when the lens thereof has a raindrop on the surface thereof is compared to that of an image captured through the lens having no raindrop, the average frequency power of the higher frequency range tends to decrease more significantly. FIGS. 5B and 5C show one example thereof.

Figure 6:
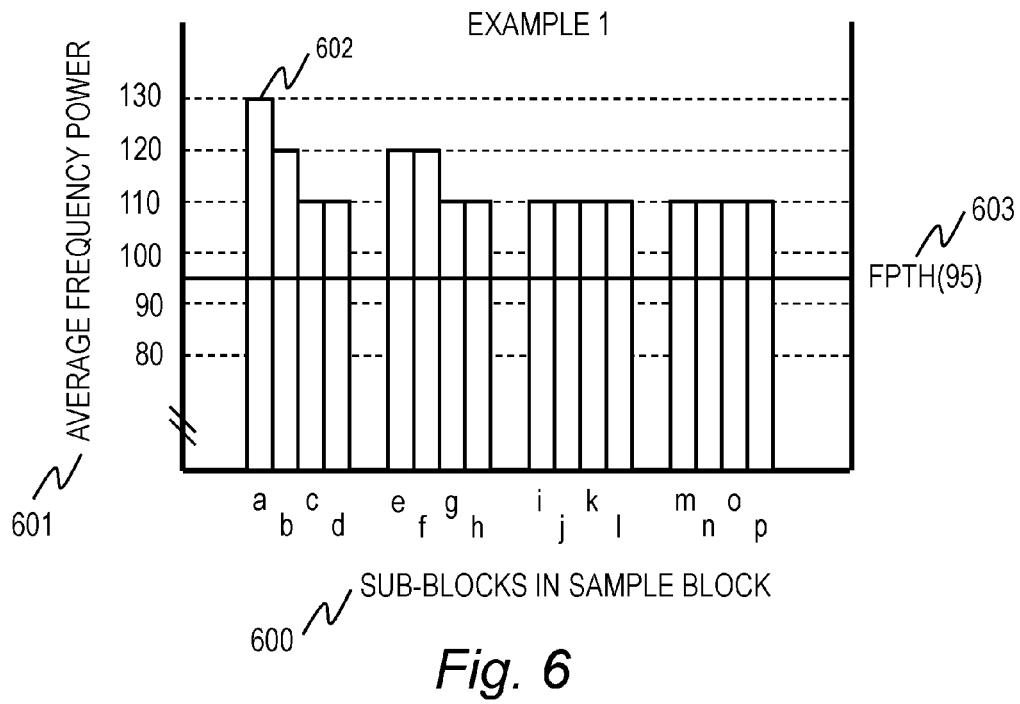
FIG. 6 is a diagram showing an example of a threshold comparison method in a sample block of an image having no raindrops of Embodiment 1 of the present invention.

FIG. 6 is a diagram showing an example of the threshold comparison method in the sample block 402 of the image having no raindrops of Embodiment 1 of the present invention.

The horizontal axis of the graph shows 16 sub-blocks 600, and the vertical axis shows the average frequency powers 601 (unit: dB). The respective bars in the graph for the horizontal values a to p represent the values of the average frequency power 502 to 503 of the sub-block a500 to the sub-block p501 of FIG. 5B. For example, the bar 602 for the value "a" on the horizontal axis represents the value 130 of the average frequency power 502 for the sub-block a500 of the image having no raindrops. By comparing the respective values of the average frequency powers for the respective sub-blocks with a predetermined frequency power threshold FPTH 603, presence or absence of a raindrop is determined.

In this example, the value of the frequency power threshold FPTH 603 is set to 95. In the example of FIG. 6, the average frequency power for every sub-block exceeds the frequency power threshold FPTH 603.

Figure 7:
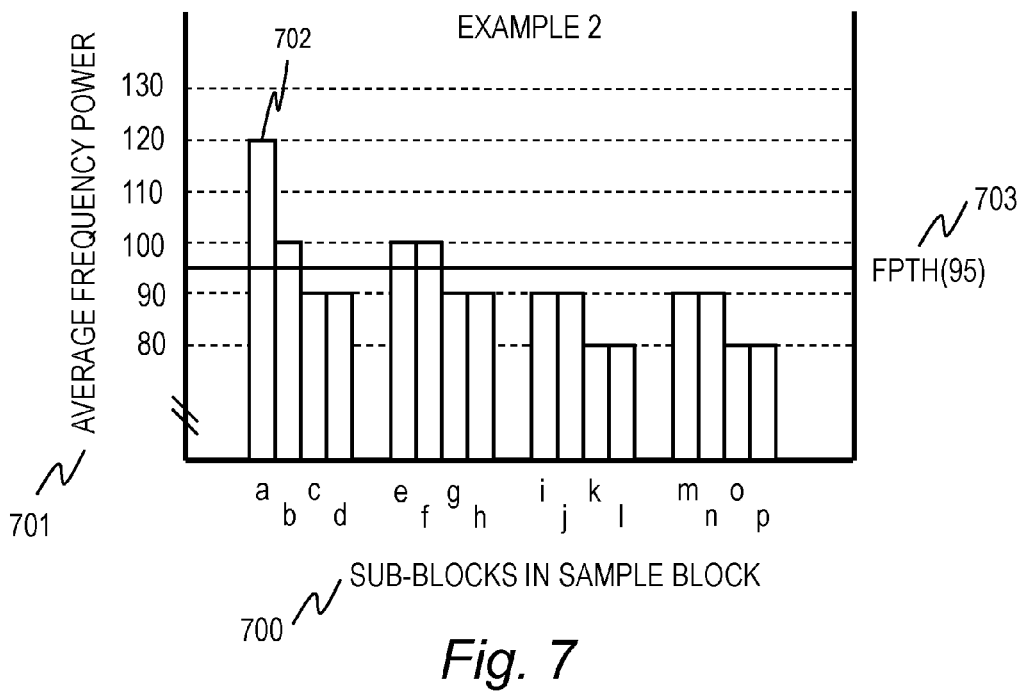
FIG. 7 is a diagram showing an example of the threshold comparison method in the sample block of the image having a raindrop of Embodiment 1 of the present invention.

FIG. 7 is a diagram showing an example of the threshold comparison method in the sample block of the image having a raindrop of Embodiment 1 of the present invention.

As in FIG. 6, the horizontal axis of the graph shows 16 sub-blocks 700, and the vertical axis shows the average frequency powers 701 (unit: dB). The respective bars in the graph for the horizontal values "a" to "p" represent the values of the average frequency powers 502 to 503 of the sub-block a500 to the sub-block p501 of FIG. 5C. For example, the bar 702 for the value "a" on the horizontal axis represents the value 120 of the average frequency power 502 for the sub-block a500 of the image having a raindrop. By comparing the respective values of the average frequency powers for the respective sub-blocks with a predetermined frequency power threshold FPTH 703, presence or absence of a raindrop is determined. In this example, the value of the frequency power threshold FPTH 703 is set to 95. In the example of FIG. 7, the average frequency powers for four sub-blocks a, b, e, and f exceed the frequency power threshold FPTH 703, and the average frequency powers for 12 sub-blocks other than a, b, e, and f does not exceed the frequency power threshold FPTH 703.

Figure 8A:
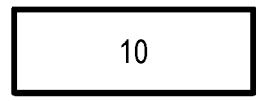
FIGS. 8A-8C are diagrams for explaining an example of an operation of a raindrop score calculation unit of Embodiment 1 of the present invention.
Figure 8B:
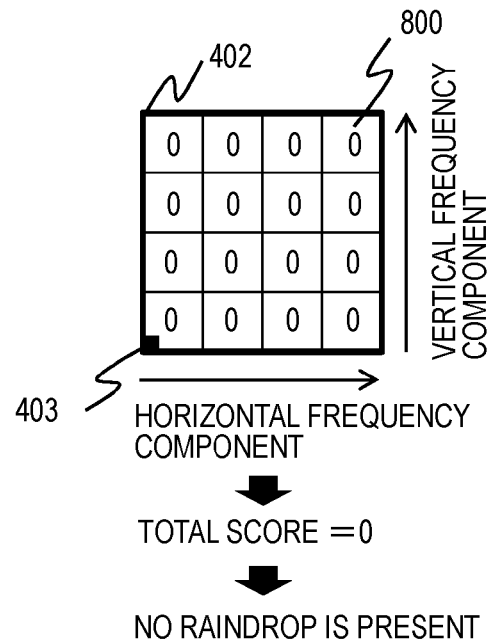
Figure 8C:
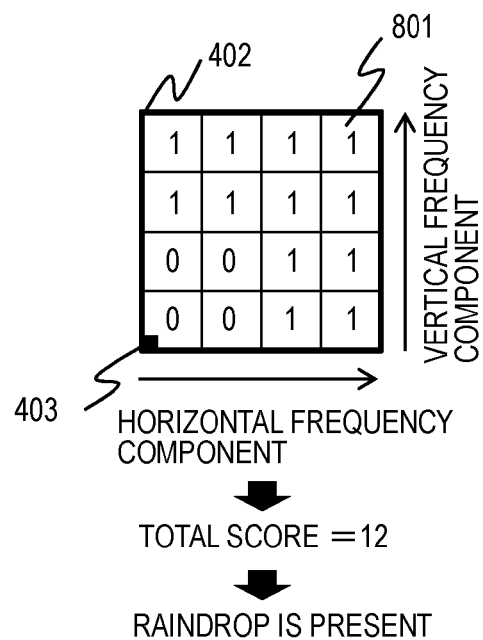

FIGS. 8A-8C diagrams for explaining an example of the operation of the raindrop score calculation unit 103 of Embodiment 1 of the present invention.

The raindrop score calculation unit 103 first counts the number of sub-blocks having the average frequency powers not exceeding the frequency power threshold FPTH, which will be used as the total score. Next, the raindrop score calculation unit 103 compares the total score with a raindrop score threshold value (FIG. 8A) of the sample block 402, and determines presence or absence of raindrops for each sample block 402.

In the example of FIGS. 8A-8C, a flag "0" is placed on a sub-block if the average frequency power thereof exceeds the frequency power threshold FPTH. A flag "1" is placed on a sub-block if the average frequency power thereof does not exceed the frequency power threshold FPTH.

FIG. 8B is an example of the raindrop score of the sample block 402 of the image having no raindrop shown in FIGS. 5B and 6. In the case of FIG. 8B, because there is no flag "1," the total score is "0," which does not exceed the raindrop score threshold value "10," this sample block 402 is deemed to have no raindrop.

FIG. 8C is an example of the raindrop score of the sample block 402 of the image having a raindrop shown in FIGS. 5C and 7. In the case of FIG. 8C, because there are 12 of the flag "1," the total score is "12," which exceeds the raindrop score threshold value "10," this sample block 402 is deemed to have a raindrop.

The method explained with reference to FIGS. 5A to 8C is a method to determine presence or absence of raindrops based on a presumption that if a sample block 402 includes many sub-blocks having small average frequency powers, the image frequency thereof is low. This method allows for accurate detection of lens dirtiness even if the dirtiness is transparent such as a water droplet. However, this method is merely one example of the specific raindrop detection method of the present invention wherein presence or absence of raindrops is determined utilizing the characteristic that an image having raindrops has a lower image frequency, and an image having no raindrops has a higher image frequency, and the scope of the present invention may include various specific methods other than that described above.

For example, the image frequency analysis unit 102 may divide the sample block 402, which corresponds to the quadrant A of FIG. 4B, into more than 16 sub-blocks, or may divide the sample block 402 into less than 16 sub-blocks or does not have to divide the sample block 402 into a plurality of sub-blocks. If the sample block 402 is not divided into a plurality of sub-blocks, the image frequency analysis unit 102 calculates the average frequency power of the entire quadrant A, and determines whether the value exceeds the threshold value or not, thereby detecting raindrops existing in the divided region that corresponds to the sample block 402.

However, while the average frequency power calculated without dividing the sample block 402 is easily affected by the DC component, the DC component is less easily affected by raindrops. Thus, in order to accurately determine the presence or absence of raindrops, it is preferable to divide the sample block 402 into a plurality of sub-blocks to an extent that the calculation amount is not too much, which allows the frequency power to be observed in a high frequency range.

FIG. 9 is a diagram for explaining an example of the operation of the raindrop region information generation unit 104 of Embodiment 1 of the present invention.

The raindrop region information generation unit 104 places a flag "0" or "1" indicating the raindrop judgment result for each sample block 402, which was provided by the raindrop score calculation unit 103, on each of the divided regions of the image shown in FIG. 2B. Specifically, the raindrop region information generation unit 104 places the flag "0" on each divided region (900) deemed to have no raindrops, and places the flag "1" on each divided region (901) deemed to have raindrops, thereby generating the raindrop region information. By referring to this raindrop region information, the user can visually confirm an area of the screen where raindrops exist.

FIGS. 10A and 10B are diagrams for explaining an example of the operation of the raindrop judgment unit 105 of Embodiment 1 of the present invention.

The raindrop region information allows the user to visually know where in the image raindrops are, but some types of the surrounding area recognition function require binary output indicating the judgment results, i.e., presence or absence of a raindrop for each image (for the entire image 200 of FIG. 9, for example).

In order to fulfill such needs, the raindrop judgment unit 105 appropriately sets a raindrop score threshold (FIG. 10A) for the entire image, and compares the threshold with the total raindrop score that is the total number of the flags "1" (indicating presence of raindrops) of the raindrop region information, which was generated by the raindrop region information generation unit 104, in the entire image.

The raindrop judgment results for each sample block of the image 200 of FIG. 10B are the same as those of FIG. 9. In this example, the total raindrop score is "32," which exceeds the raindrop score threshold "30," and therefore, the raindrop judgment unit 105 outputs the raindrop judgment information indicating the "presence of raindrops" as the raindrop judgment result of this image. If the total raindrop score does not exceed the raindrop score threshold, the raindrop judgment unit 105 outputs the raindrop judgment information indicating the "absence of raindrops." This way, the surrounding area recognition unit 106 learns the presence or absence of raindrop in each image.

Embodiment 2

Next, Embodiment 2 of the present invention will be explained. Except for differences described below, the outside recognition apparatus 100 of Embodiment 2 is the same as the outside recognition apparatus 100 of Embodiment 1, and therefore, the illustration and explanation for the other parts than the differing parts will be omitted.

Figures 11A, 11B, 11C:
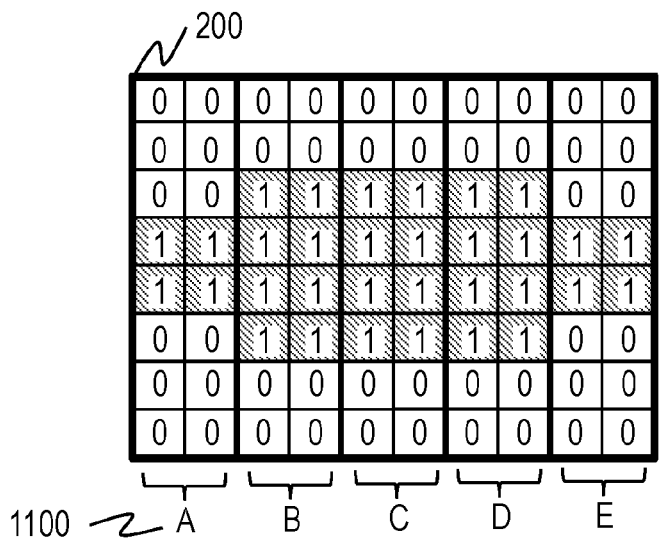
FIGS. 11A-11C are diagrams for explaining an example of an operation of a raindrop judgment unit of Embodiment 2 of the present invention.

FIGS. 11A-11C are diagrams for explaining an example of the operation of the raindrop judgment unit 105 of Embodiment 2 of the present invention.

Specifically, FIGS. 11A-11C show examples of outputting the raindrop judgment result for each of a plurality of divided regions in an image, instead of outputting a single raindrop judgment result for one image (the entire image 200 of FIG. 10B, for example). The raindrop judgment results for the respective sample blocks 402 of the image 200 of FIG. 11B are the same as those of FIGS. 9 and 10B. As shown in FIG. 11B, the raindrop judgment unit 105 sets a raindrop score threshold (FIG. 11A) of the image divided region appropriately, divides one image 200 into five regions 1100 of A, B, C, D, and E, and calculates the total raindrop score 1101 for each of the divided regions.

FIG. 11B shows an example in which each divided region 1100 includes 16 (2×8) blocks. The raindrop judgment unit 105 compares the total raindrop score 1101 of each divided region with the raindrop score threshold for the corresponding image divided region, thereby obtaining the raindrop judgment information for each image divided region. If the total raindrop score 1101 of a divided region exceeds the raindrop score threshold, the raindrop judgment unit 105 outputs, as the raindrop judgment information 1102 for each of the divided region, "1" indicating presence of raindrops. If the total raindrop score 1101 of each divided region does not exceed the raindrop score threshold, the raindrop judgment unit 105 outputs, as the raindrop judgment information 1102 for each of the divided region, "0" indicating absence of raindrops.

As described, by increasing the number of image regions that are to be subjected to the raindrop judgment, the dirtiness detection unit 108 and the surrounding area recognition unit 107 can receive information on specific areas of the image where raindrops are present. As a result, more detailed control on the recognition operation for surrounding areas is made possible such as stopping the recognition operation only in areas where raindrops are present.

Embodiment 3

Next, Embodiment 3 of the present invention will be explained. Except for differences described below, the outside recognition apparatus 100 of Embodiment 3 is the same as the outside recognition apparatus 100 of Embodiment 1, and therefore, the illustration and explanation for the other parts than the differing parts will be omitted. The respective parts of the outside recognition apparatus 100 of Embodiment 3 shown in the figure have the same functions as the respective parts of Embodiment 1 given the same reference characters, and therefore, the descriptions thereof will be omitted.

Figure 12:
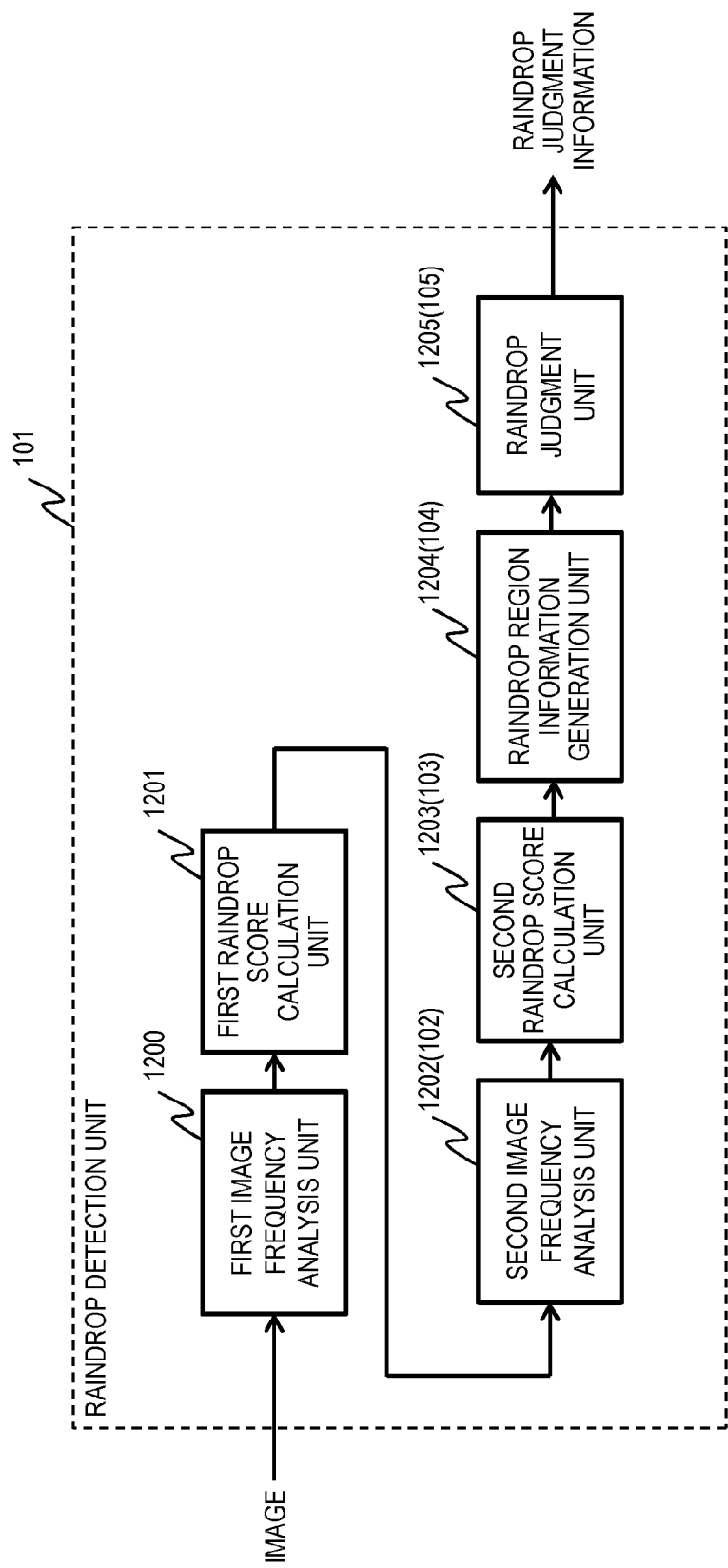
FIG. 12 is a function block diagram illustrating an example of a configuration of a raindrop detection unit of Embodiment 3 of the present invention.

FIG. 12 is a function block diagram illustrating an example of the configuration of the raindrop detection unit 101 of Embodiment 3 of the present invention.

In this embodiment, the image frequency analysis unit is configured to have two steps to improve the analysis accuracy of the image frequency. The raindrop detection unit 101 of FIG. 12 includes a first image frequency analysis unit 1200 configured to conduct the image frequency analysis for divided regions of a larger image size, a first raindrop score calculation unit 1201 configured to calculate raindrop scores of the respective divided regions of a larger image size, a second image frequency analysis unit 1202 configured to conduct the image frequency analysis for divided regions of a smaller image size (same as the image frequency analysis unit 102 of FIG. 1), a second raindrop score calculation unit 1203 configured to calculate raindrop scores of the respective divided regions of a smaller image size (same as the raindrop score calculation unit 103 of FIG. 1), a raindrop region information generation unit 1204 (same as the raindrop region information generation unit 104 of FIG. 1), and a raindrop judgment unit 1205 (same as the raindrop judgment unit 105 of FIG. 1).

The operations of the first image frequency analysis unit 1200 and the first raindrop score calculation unit 1201 will be explained below. In the example described below, the "smaller image size" is the same size as the divided regions shown in FIG. 2B, and the "larger image size" is larger than the "smaller image size" and smaller than the size of the entire one-frame image. Thus, the second image frequency analysis unit 1202 and the second raindrop score calculation unit 1203 perform the same operations as the image frequency analysis unit 102 and the raindrop score calculation unit 103 described with FIG. 1. Furthermore, the raindrop region information generation unit 1204 and the raindrop judgment unit 1205 perform the same operations as the raindrop region information generation unit 104 and the raindrop judgment unit 105. Below, the descriptions of the respective parts that perform the same operations as those in FIG. 1 will be omitted.

Figure 13A:
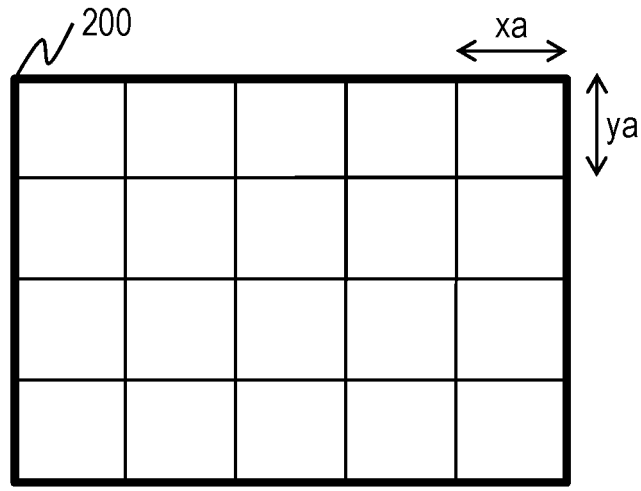
FIGS. 13A and 13B are diagrams for explaining an example of an operation of a first image frequency analysis unit of Embodiment 3 of the present invention.
Figure 13B:
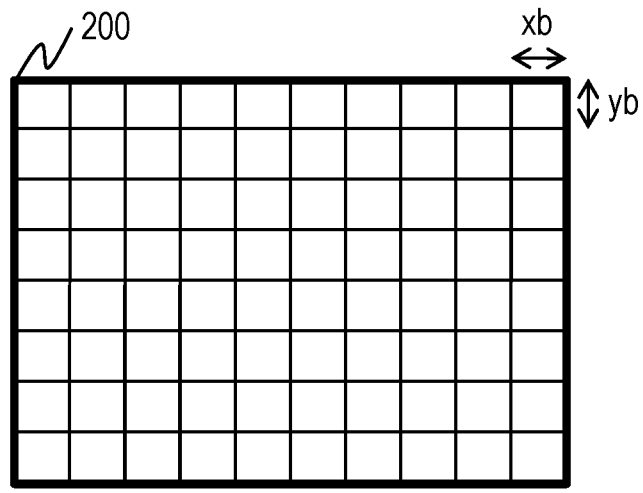

FIGS. 13A and 13B are diagrams for explaining an example of the operation of the first image frequency analysis unit 1200 of Embodiment 3 of the present invention.

The first image frequency analysis unit 1200 divides the image 200 of the vehicle-mounted camera into a larger image size than the image size of regions divided by the second image frequency analysis unit 1202. For example, FIG. 13A illustrates an example in which the image size of each region divided by the first image frequency analysis unit 1200 is 64×64 pixels. FIG. 13B illustrates an example in which the image size of each region divided by the second image frequency analysis unit 1202 is 32×32 pixels.

A method to obtain the image frequency by the first image frequency analysis unit 1200 is the same as above except that the image size of each divided region differs. The method to calculate the average frequency power is the same as that of FIGS. 4A to 5C, and the description thereof is therefore omitted.

The image size of regions divided by the first image frequency analysis unit 1200 may be set to any size as long as it is larger than the image size of regions divided by the second image frequency analysis unit 1202.

Figure 14:
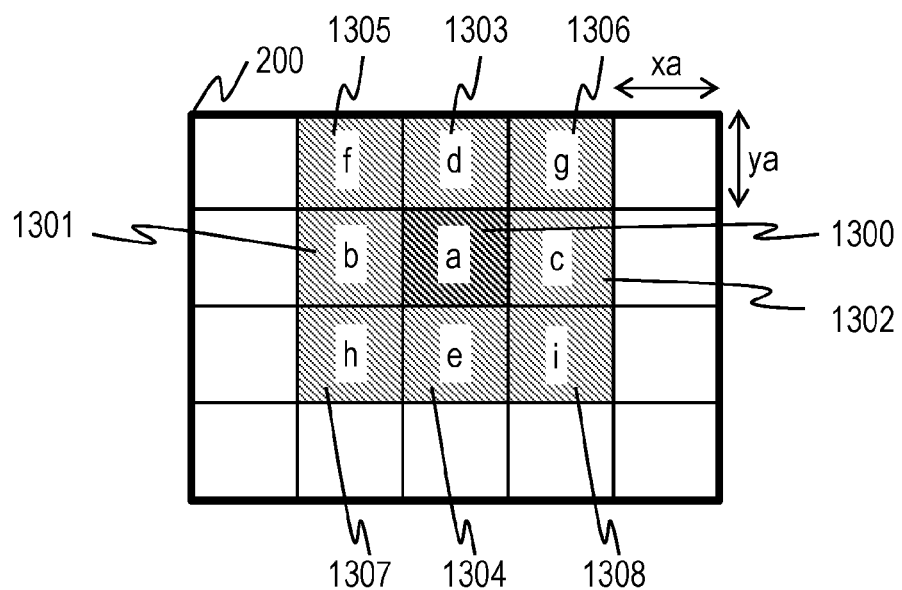
FIG. 14 is a diagram for explaining an example of an operation of a first raindrop score calculation unit of Embodiment 3 of the present invention, which takes into consideration surrounding regions.

FIG. 14 is a diagram for explaining an example of the operation of the first raindrop score calculation unit 1201 of Embodiment 3 of the present invention, which takes into consideration the surrounding regions.

The first raindrop score calculation unit 1201 calculates the average frequency power with the procedures described with FIGS. 4A to 5C, and 13A, and adds the average frequency power of each region to the average frequency powers of surrounding regions at a predetermined ratio. The resultant average frequency power is the final average frequency power Pave of each region. The target region for the calculation of the final average frequency power Pave is described as a focused region. The surrounding regions include at least a plurality of regions adjacent to the focused region. In the example below, eight regions 1301 to 1308 adjacent to the focused region 1300 are the surrounding regions.

For example, the final average frequency power Pave is calculated by Formula (5).

[Formula 5]

$$Pave = (a \times K1) + ((b + c + d + e + f + g + h + i) \times K2) \quad \text{(Formula 5)}$$

where "a" to "i" are the average frequency powers obtained for the respective divided regions;
K1=first factor (0.7, for example); and
K2=second factor (0.375, for example).

The first factor K1 and the second factor K2 may be appropriately set depending on the importance of surrounding regions, or in other words, how much of the average frequency powers of the surrounding regions would be used for the raindrop detection together with the average frequency power of the focused region.

Some focused regions do not have a part of the surrounding regions (such as the divided region f1305, divided region d1303, and divided region g 1306 located in edge portion of the image). In this case, the average frequency power of the missing region may be set to 0 in the calculation of Pave, or the average frequency power of the missing region may be substituted with the average frequency power of the focused region in the calculation of Pave. Alternatively, an approximate average frequency power obtained based on the average frequency power of the adjacent divided regions in another method may be used.

When the size of a divided region is large, it might not be possible to detect a raindrop in a part of the focused region. However, if surrounding regions are deemed to have raindrops, for example, the focused region is likely to have raindrops therein. Thus, as described above, by using not only the average frequency power of the focused region, but also the average frequency powers of the surrounding regions through weighed calculation, presence or absence of raindrops can be detected accurately even if the size of a divided region is large.

Figure 15A:
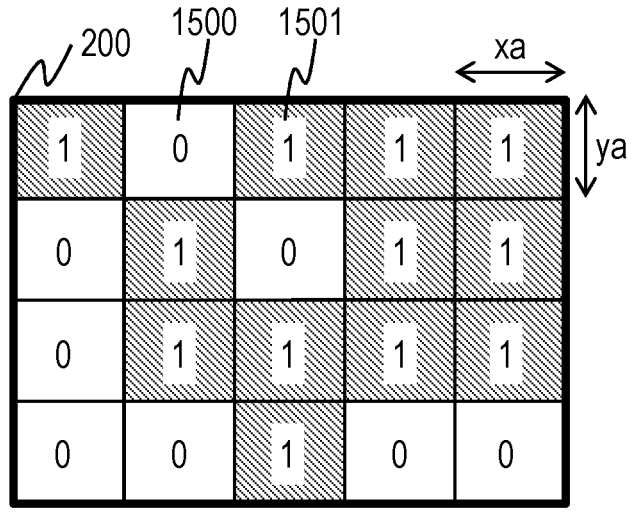
FIGS. 15A and 15B are diagrams for explaining a thinning process of the process regions by the first raindrop score calculation unit of Embodiment 3 of the present invention.
Figure 15B:
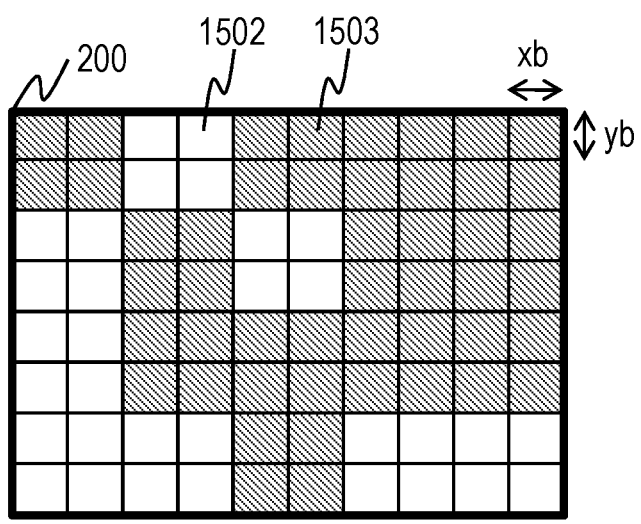

FIGS. 15A and 15B are diagrams for explaining a thinning process of the process regions by the first raindrop score calculation unit 1201 of Embodiment 3 of the present invention.

The first raindrop score calculation unit 1201 calculates the raindrop scores in the same manner as the method to calculate the raindrop scores for the sample block shown in FIGS. 8A-8C. However, because the image size of the divided regions differs from that of FIGS. 8A-8C, the size of the sample block differs. As shown in the example of FIG. 13A, because the image size of one divided region is 64×64 pixels, the first raindrop score calculation unit 1201 defines the image frequency data number of the quadrant A, which is obtained through DFT, as 32×32 in the calculation.

Using this image frequency data number, the first raindrop score calculation unit 1201 counts the number of sub-blocks with the average frequency power thereof not exceeding the frequency power threshold FPTH, and the resultant number is the total score. The first raindrop score calculation unit 1201 compares this total score with the raindrop score threshold (FIG. 8A) of the sample block, thereby determining presence or absence of raindrops in each sample block.

FIG. 15A shows the state in which the flag "1" is placed in each region 1501 deemed to have raindrops, and the flag "0" is placed in each region 1500 deemed to have no raindrops after the presence or absence of raindrops has been determined by the first raindrop score calculation unit 1201.

Next, the second image frequency analysis unit 1202 and the second raindrop score calculation unit 1203 perform the respective processes, but in this example, only the regions having the flag "1," which were deemed to have raindrops by the first raindrop score calculation unit 1201, are to be processed. FIG. 15B shows an example of two different parts 1502 and 1503. The parts 1503 are to be processed by the second image frequency analysis unit 1202 and the second raindrop score calculation unit 1203 (regions temporarily deemed to have raindrops), and the parts 1502 are not subjected to such processes (regions temporarily deemed to have no raindrops) according to the raindrop judgment result of the first raindrop score calculation unit 1201 shown in FIG. 15A.

With the process described above, regions deemed to have no raindrops by the first raindrop score calculation unit 1201 are not subjected to the processes of the second image frequency analysis unit 1202 and the second raindrop score calculation unit 1203, and therefore, the calculation amount can be reduced.

Embodiment 4

Next, Embodiment 4 of the present invention will be explained. Except for differences described below, the outside recognition apparatus 100 of Embodiment 4 is the same as the outside recognition apparatus 100 of Embodiment 1, and therefore, the illustration and explanation for the other parts than the differing parts will be omitted. The respective parts of the outside recognition apparatus 100 of Embodiment 4 shown in the figure have the same functions as the respective parts of Embodiment 1 given the same reference characters, and therefore, the descriptions thereof will be omitted.

Figure 16:
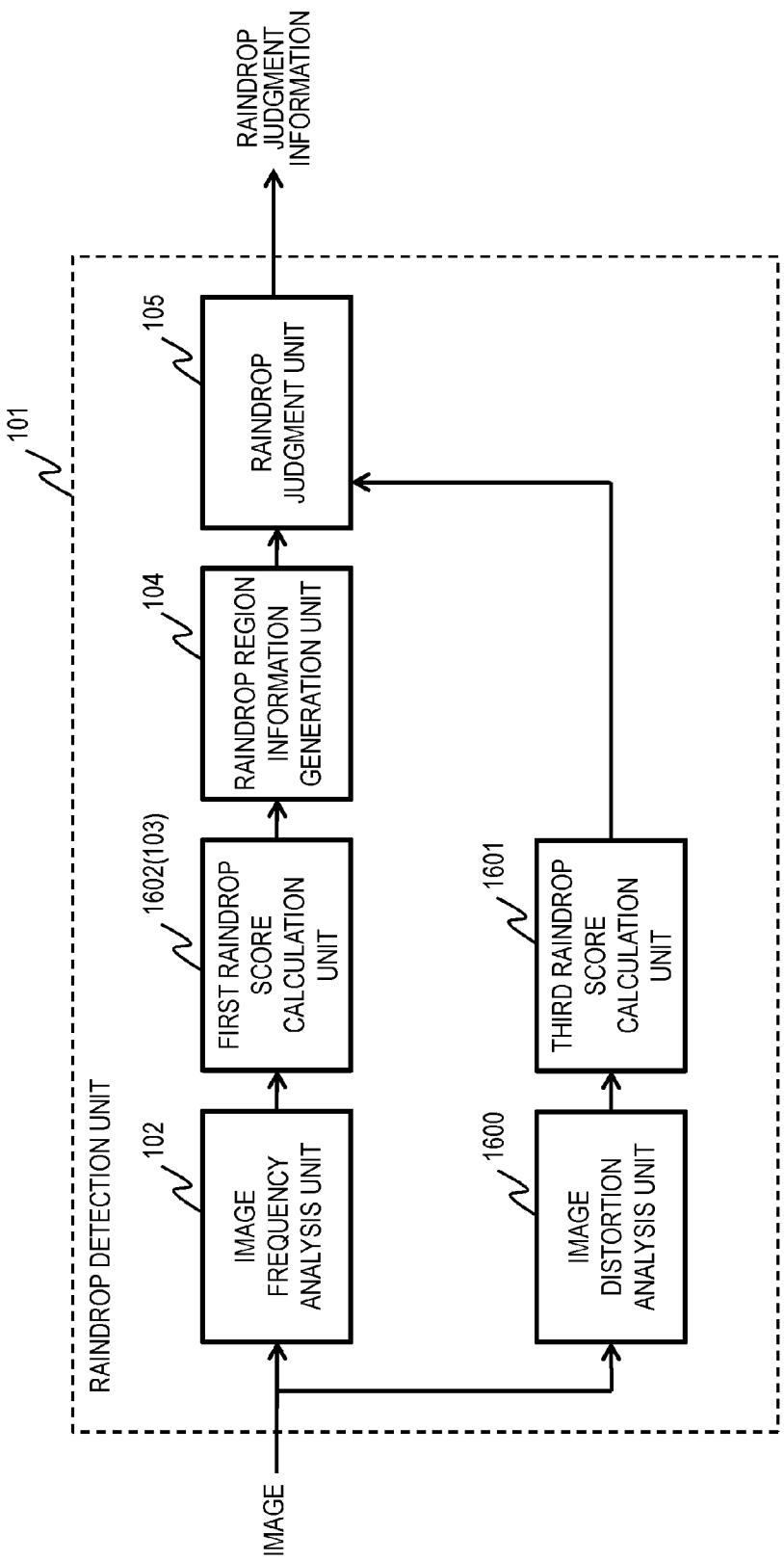
FIG. 16 is a function block diagram illustrating an example of a configuration of a raindrop detection unit of Embodiment 4 of the present invention.

FIG. 16 is a function block diagram illustrating an example of the configuration of the raindrop detection unit 101 of Embodiment 4 of the present invention.

As shown in FIG. 2A, an image of the vehicle-mounted camera 111 always includes the light-shielding panel 202, the top edge 202 (finisher) of the vehicle body, the bumper 203, and the license plate 204 as stationary subjects. In addition to the image frequency analysis method described above, by detecting distortion in the stationary subject sections caused by raindrops through image processing, presence or absence of raindrops can be determined more accurately.

As shown in FIG. 16, another raindrop detection unit 101 of the present invention includes an image frequency analysis unit 102, a first raindrop score calculation unit 1602 (same as the raindrop score calculation unit 103 of FIG. 1), a raindrop region information generation unit 104, and a raindrop judgment unit 105 as in the raindrop detection unit 101 of FIG. 1. The raindrop detection unit 101 of this embodiment also includes an image distortion analysis unit 1600 configured to conduct image processing to detect distortion of an image in the stationary subject sections, which is caused by raindrops, and a third raindrop score calculation unit 1601 that calculates a raindrop score additional value based on the result of the image distortion analysis.

Figure 17:
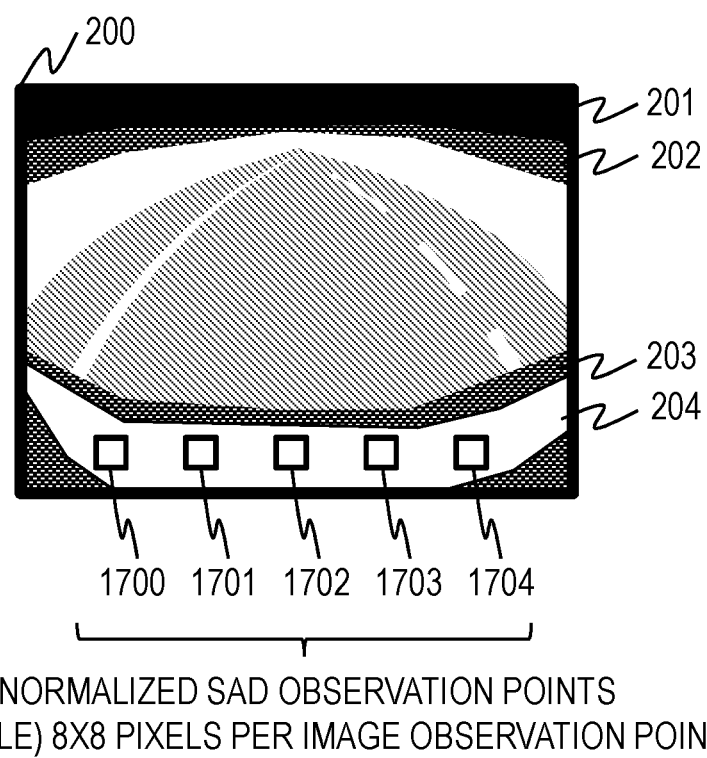
FIG. 17 is a diagram for explaining an example of setting image observation points in an image distortion analysis unit of Embodiment 4 of the present invention.

FIG. 17 is a diagram for explaining an example of setting image observation points in the image distortion analysis unit 1600 of Embodiment 4 of the present invention.

In the image distortion detection, the normalized SAD (sum of absolute difference) of each image observation point is calculated, and the normalized SAD is compared with a predetermined threshold, thereby detecting image distortion. FIG. 17 shows an example in which the image size of one image observation point is 8×8 pixels, and five image observation points 1700 to 1704 having a predetermined interval are provided on the license plate.

The image size and the number of image observation points may be set to any appropriate values as long as those observation points are located within an area of a stationary subject, or in other words, an area where the same subject always appears (in particular, the same edge part of the same subject). Image observation points may be set in an area where other stationary subjects than the license plate appear, such as the light-shielding panel 201, the top edge 202 (finisher) of the vehicle body, or the bumper 203. It is also possible to process the image of the stationary subjects to make it easier to detect image distortion such as laying a predetermined pattern (checkered pattern, for example) over the light-shielding panel 201, the top edge 202 (finisher) of the vehicle body, or the bumper 203.

Figure 18:
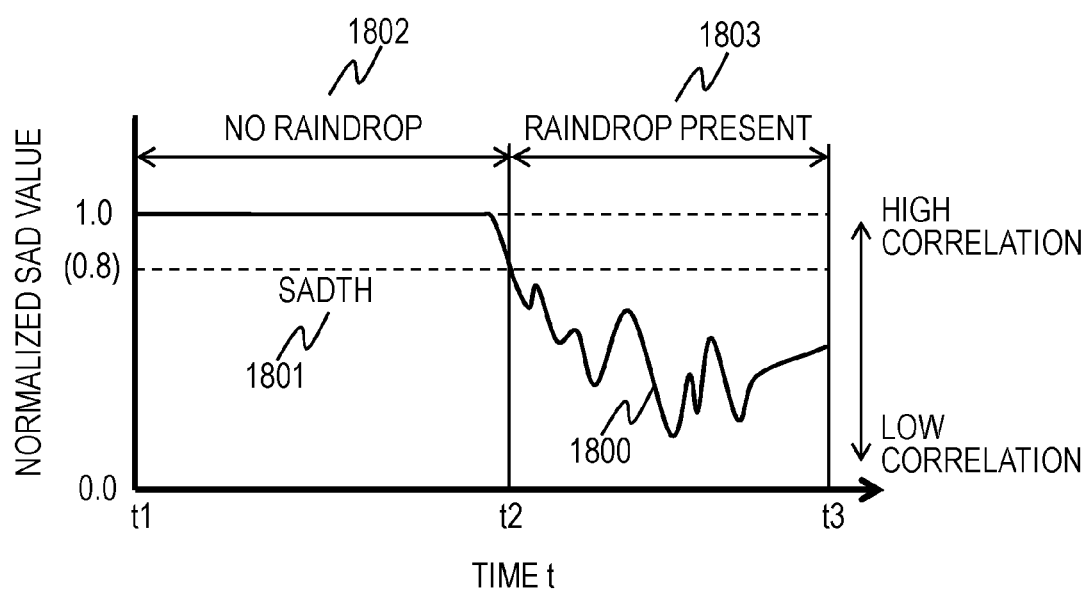
FIG. 18 is a diagram for explaining an example of a detection process of the image distortion analysis unit of Embodiment 4 of the present invention.

FIG. 18 is a diagram for explaining an example of the detection process of the image distortion analysis unit 1600 of Embodiment 4 of the present invention.

Normalized SAD (NSAD) is calculated using Formula 6.

[Formula 6]

$$NSAD = \frac{\sum_{j=0}^{N-1}\sum_{i=0}^{M-1}((I(i,j)-\bar{I})(T(i,j)-\bar{T})}{\sqrt{\sum_{j=0}^{N-1}\sum_{i=0}^{M-1}(I(i,j)-\bar{I})^2 \times \sum_{j=0}^{N-1}\sum_{i=0}^{M-1}(T(i,j)-\bar{T})^2}}$$ (Formula 6)

Here, the following formulae are satisfied:

[Formula 7]

Average illuminance of template image $\bar{T} = \dfrac{\sum_{j=0}^{N-1}\sum_{i=0}^{M-1}T(i,j)}{MN}$ (Formula 7)

[Formula 8]

Average illuminance of observed image $\bar{I} = \dfrac{\sum_{j=0}^{N-1}\sum_{i=0}^{M-1}I(i,j)}{MN}$ (Formula 8)

where T is a template image, I is an observed image, T(i,j) is pixels of the temperate image, I(i,j) is pixels of the observed image, M is the number of pixels of the template image and observed image in the horizontal direction, N is the number of pixels of the observed image in the horizontal direction, "i" is the horizontal coordinates and "j" is the vertical coordinates.

The graph of FIG. 18 shows the results of calculation of the normalized SAD 1800 in a period from time t1 to time t3 at a single image observation point. The stronger the correlation between the template image and the observed image is, the closer the value of normalized SAD is to 1.0. On the other hand, the weaker the correlation between the respective images, the closer the value of normalized SAD is to 0.

When an image having no raindrops is stored as the template image, because the observed image having raindrops is susceptible to distortion, the value of normalized SAD is closer to 0. On the other hand, the observed image having no raindrops is not susceptible to distortion, and therefore the value of normalized SAD is closer to 1.

If the threshold SADTH 1801 for the raindrop judgment is set to 0.8, an image captured when the normalized SAD value was 0.8 or greater is deemed to have no raindrops, and is provided with the raindrop score of "0." An image captured when the normalized SAD value was 0.8 or smaller is deemed to have raindrops, and is provided with the raindrop score of "1."

In the example of FIG. 18, the period from time t1 to t2 is the period 1802 in which no raindrops are present, and the period from time t2 to t3 is the period 1803 in which raindrops are present.

FIGS. 19A and 19B are diagrams for explaining an example of the operation of the third raindrop score calculation unit 1601 of Embodiment 4 of the present invention.

FIG. 19A shows a setting example of the normalized SAD score threshold 1900 and the raindrop score additional value 1901. The normalized SAD score threshold 1900 is the threshold value 1900 for the number of the observation points, out of the observation points set in FIG. 17, to be used to detect image distortion (i.e., to detect presence of raindrops). The raindrop score additional value 1901 is an additional value for the total raindrop score, which was calculated by the image frequency analysis unit of the raindrop judgment unit 105.

The total raindrop score 1902 of the normalized SAD observation points is the total value of the raindrop scores of all observation points (five observation points in the example of FIG. 17). In the example of FIG. 17, the five observation points 1700 to 1704 are set, and therefore, the value of the total raindrop score 1902 for the normalized SAD observation points at each time is either one of 0 to 5.

FIG. 19B is a table of the total raindrop scores 1902 of the normalized SAD observation points as a result of the raindrop judgment based on the normalized SAD obtained for five observation points in each of the eight images captured at eight different times, namely from time t1 to time t8 (i.e., 8 frames). From time t1 to time t4 where the total raindrop scores 1902 of the normalized SAD observation points are smaller than the normalized SAD score threshold 1900, raindrops are deemed absent, and the raindrop score additional value 1903 is set to "0." From time t5 to time t8 where the total raindrop scores 1902 of the normalized SAD observation points are equal to or greater than the normalized SAD score threshold 1900, raindrops are deemed present, and the raindrop score additional value 1903 is set to "5."

FIGS. 19A and 19B are merely examples, and the normalized SAD score threshold 1900 and the raindrop score additional value 1901 may be any other appropriate values.

FIG. 20 is a diagram for explaining the operation of the raindrop judgment unit 105 in conducting the image distortion analysis in Embodiment 4 of the present invention.

When the raindrop detection unit 101 includes the image distortion analysis unit 1600 and the third raindrop score calculation unit 1601, the raindrop judgment unit 105 adds the raindrop score obtained through the image distortion process to the raindrop score 2000 obtained through the image frequency analysis process, and the resultant score is used as the total raindrop score in determining presence or absence of raindrops.

As described above, by determining presence or absence of raindrops using not only the raindrop score obtained through the frequency analysis, but also the raindrop score obtained through the image distortion analysis, it is possible to detect raindrops more accurately. Also, by using the normalized SAD, it is possible to perform the image distortion analysis less susceptible to a change in environment (change in brightness due to factors such as whether the image was captured in daytime or nighttime, and inside or outside of a tunnel).

Embodiment 5

Next, Embodiment 5 of the present invention will be explained. Except for differences described below, the outside recognition apparatus 100 of Embodiment 5 is the same as the outside recognition apparatus 100 of Embodiment 1, and therefore, the illustration and explanation for the other parts than the differing parts will be omitted. The respective parts of the outside recognition apparatus 100 of Embodiment 5 shown in the figure have the same functions as the respective parts of Embodiments 1 to 4 given the same reference characters, and therefore, the descriptions thereof will be omitted.

Figure 21:
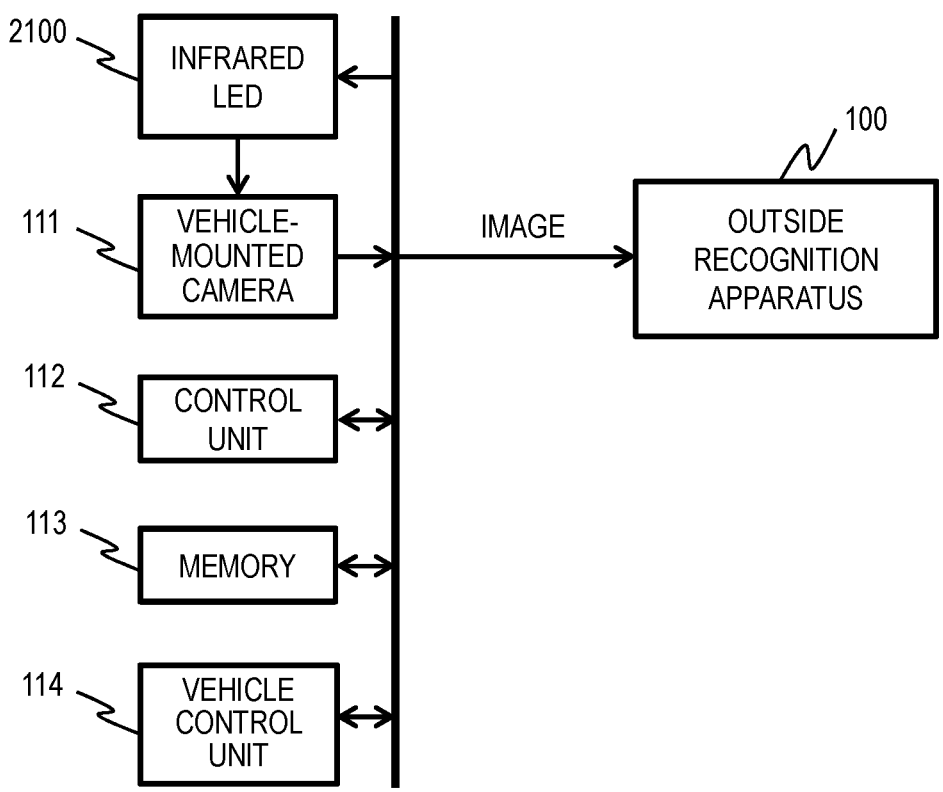
FIG. 21 is a function block diagram illustrating an example of an outside recognition apparatus of Embodiment 5 of the present invention.

FIG. 21 is a function block diagram illustrating an example of the outside recognition apparatus 100 of Embodiment 5 of the present invention.

Specifically, FIG. 21 shows an example of the configuration in which infrared LED light is radiated to the lens surface of the vehicle-mounted camera 111, thereby ensuring a sufficient raindrop detection performance even when the image contrast lowers such as nighttime.

When the vehicle is driving during the night or through a long tunnel, the image contrast of the vehicle-mounted camera 111 significantly lowers, which also lowers the accuracy of the raindrop observation based on images. In order to ensure a sufficient raindrop detection performance even when the image contrast is low due to nighttime driving and the like, infrared LED light is radiated to the lens surface of the vehicle-mounted camera 111 to highlight the outlines of raindrops. This way, a sufficient raindrop detection performance can be ensured in the image frequency analysis process and image distortion analysis process. The infrared LED light is a light in the near infrared wavelength range from approximately 780 nm to 2600 nm, and will be simply referred to as infrared LED in the descriptions below. The infrared light affects colors of a color image, and colors of the affected image look unnatural. Therefore, usually, the vehicle-mounted camera 111 and a digital camera perform a filtering process to cut wavelength components greater than visible light (wavelength of approximately 780 nm or greater) in the internal signal process.

However, in reality, it is difficult to completely remove the wavelength of 780 nm or greater, and therefore, a sufficient amount of wavelength components of near infrared exists in an image captured by the vehicle-mounted camera 111. The method of the present invention utilizes this characteristics. Also because radiated light of infrared LED is not visible to human eyes, even if light is intermittently radiated to the vehicle-mounted camera 111, this light does not affect other drivers or pedestrians.

A control unit 112 turns on and off the infrared LED (2100). The control unit 112 determines the image capturing environment of the vehicle-mounted camera 111 such as nighttime driving or driving in a long tunnel by monitoring images of the vehicle-mounted camera 111 and detecting a significant reduction in image contrast over a long period of time, and the like. When a significant reduction in image contrast is detected, the control unit 112 turns on the infrared LED 2100. When the image contrast comes back to the same level as daytime, the control unit 112 turns off the infrared LED 2100. In case of highlighting the outlines of raindrops by turning on the infrared LED 2100, the outlines of raindrops may be confirmed by causing infrared LED 2100 to flicker at a certain interval.

The process to detect a significant reduction in image contrast may be conducted by the outside recognition apparatus 100, and a request to turn on and off the infrared LED may be sent from the outside recognition apparatus 100 to the control unit 112.

When the image frequency analysis process and image distortion analysis process are conducted using raindrop outlines highlighted by the light from the infrared LED, the frequency power thresholds FPTH 603 and 703 shown in FIGS. 6 and 7 may be changed to values better suited to a lower image contrast. The threshold SADTH 1801 for raindrop judgment in the image distortion analysis unit 1600 shown in FIG. 18 may also be changed to a value better suited to a lower image contrast.

Figure 22A:
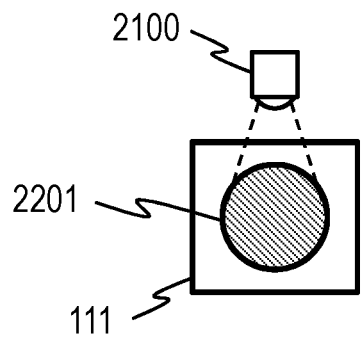
FIGS. 22A-22C are diagrams for explaining an example of an installation position of an infrared LED of Embodiment 5 of the present invention.
Figure 22B:
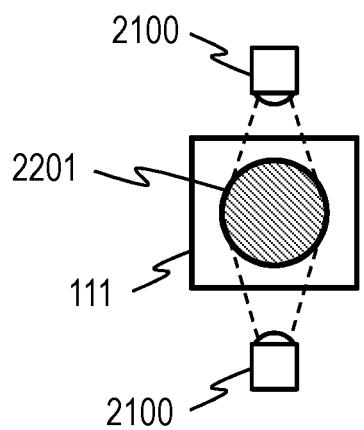
Figure 22C:
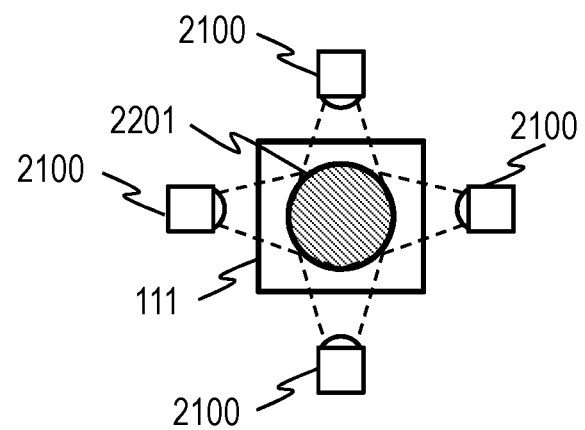

FIGS. 22A-22C are diagrams for explaining an example of the installation position of an infrared LED 2100 of Embodiment 5 of the present invention.

There may be one infrared LED 2100 installed such that radiated light hits the lens surface 2201 of the vehicle-mounted camera 111, or there may be a plurality of infrared LEDs to secure a sufficient radiation area.

FIG. 22A shows an example of having one infrared LED 2100 installed above the vehicle-mounted camera 111. FIG. 22B shows an example of having two infrared LEDs 2100 installed above and below the vehicle-mounted camera 111 to secure a sufficient radiation area. FIG. 22C shows an example of having four infrared LEDs 2100 installed above, below, left and right of the vehicle-mounted camera 111.

The number of infrared LEDs 2100 may be set to any appropriate number, and the installation positions thereof may be appropriately set to adjust the light distribution to the lens surface 2201 depending on how easily raindrops can be detected. Instead of using an individual LED device, the infrared light source may be provided inside of the vehicle-mounted camera 111, and light may be radiated to the lens surface 2201 from inside of the lens.

Embodiment 6

Next, Embodiment 6 of the present invention will be explained. The respective parts of the outside recognition apparatus 100 of Embodiment 6 have the same functions as the respective parts of Embodiments 1 to 5 given the same reference characters, and therefore, the descriptions thereof will be omitted.

Figure 23:
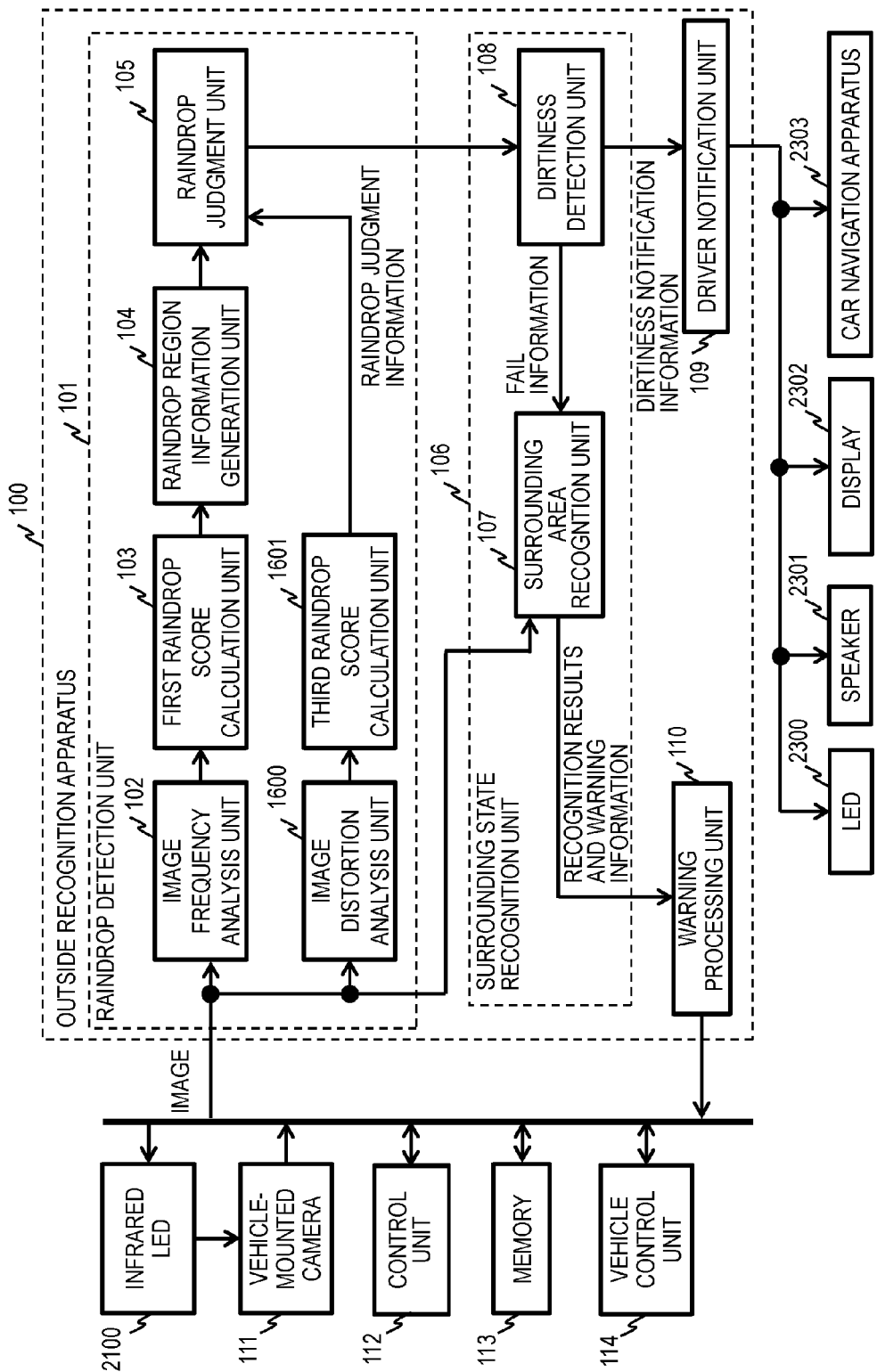
FIG. 23 is a function block diagram illustrating an example of the outside recognition apparatus of Embodiment 6 of the present invention.

FIG. 23 is a function block diagram illustrating an example of the outside recognition apparatus 100 of Embodiment 6 of the present invention.

The outside recognition apparatus 100 includes a raindrop detection unit 101, a surrounding state recognition unit 106, a warning processing unit 110, and a driver notification unit 109. The outside recognition apparatus 100 also includes an infrared LED 2100, a vehicle-mounted camera 111, a memory 113, and a control unit 112. The respective components above are the same as those given the same reference characters in the descriptions above, except for the points explained below.

The raindrop detection unit 101 is a block that determines presence or absence of raindrops on the lens surface of the vehicle-mounted camera based on an image received from the vehicle-mounted camera 111. The raindrop detection unit 101 of FIG. 23 is substantially the same as that shown in FIG. 16, and includes an image frequency analysis unit 102 that divides an image received from the vehicle-mounted camera 111 into a predetermined number of regions and that obtains an image frequency of each divided region, a first raindrop score calculation unit 103 that calculates a raindrop score indicating the likelihood of the presence of raindrops based on the obtained image frequency of each divided region, an image distortion analysis unit 1600 that detects, through image processing, image distortion in the stationary subject section caused by the presence of raindrops, a third raindrop score calculation unit 1601 that calculates a raindrop score additional value based on the results of the image distortion analysis, the raindrop region information generation unit 104 that generates a raindrop score map for one image, and the raindrop judgment unit 105 that outputs information indicating presence or absence of raindrops in each image based on the raindrop score map and the third raindrop score.

The surrounding state recognition unit 106 includes a dirtiness detection unit 108 that determines whether the lens surface of the vehicle-mounted camera 111 has a dirtiness thereon such as rain, snow, dirt, and lens deposit, a surrounding area recognition unit 107 configured to recognize the state of the areas surrounding the vehicle, and a warning processing unit 110 that sends the recognition result information and an alarm signal outputted from the surrounding area recognition unit 107 to the vehicle controller 114. When the lens surface of the vehicle-mounted camera 111 has a dirtiness such as rain, dirt, or lens deposit, the dirtiness detection unit 108 outputs a FAIL signal to the surrounding area recognition unit 107 so as to stop the operation thereof temporarily or continuously because the dirtiness makes it difficult for the surrounding area recognition unit 107 to conduct an image recognition process accurately, which could cause erroneous recognition.

The dirtiness detection unit 108 also outputs dirtiness notification information that indicates that the surrounding area recognition unit 107 is temporarily or continuously stopped to the driver notification unit 109. The driver notification unit 109 sends instructions such as audio output, lighting, or display to at least one of external devices such as an LED 2300, a speaker 2301, a display 2302, and a car navigation apparatus 2303, thereby delivering to the driver audio or visual information indicating the suspension of the surrounding area recognition unit 107 due to a lens dirtiness. Learning the operation of the surrounding area recognition unit 107 is suspended this way, the driver can drive the vehicle according to the condition or can troubleshoot (lens cleaning, for example).

The recognition process conducted by the surrounding area recognition unit 107 of FIG. 23 may be the same as the recognition process for the areas surrounding the vehicle conducted by the surrounding area recognition unit 107 of FIG. 1. The recognition process of the surrounding area recognition unit 107 of FIG. 23 also includes a lane departure warning process for warning the driver about the vehicle inappropriately departing from a car lane during driving and a blind spot warning process for warning the driver about presence of another vehicle or pedestrian in a blind spot for the driver of the vehicle.

Figure 24:
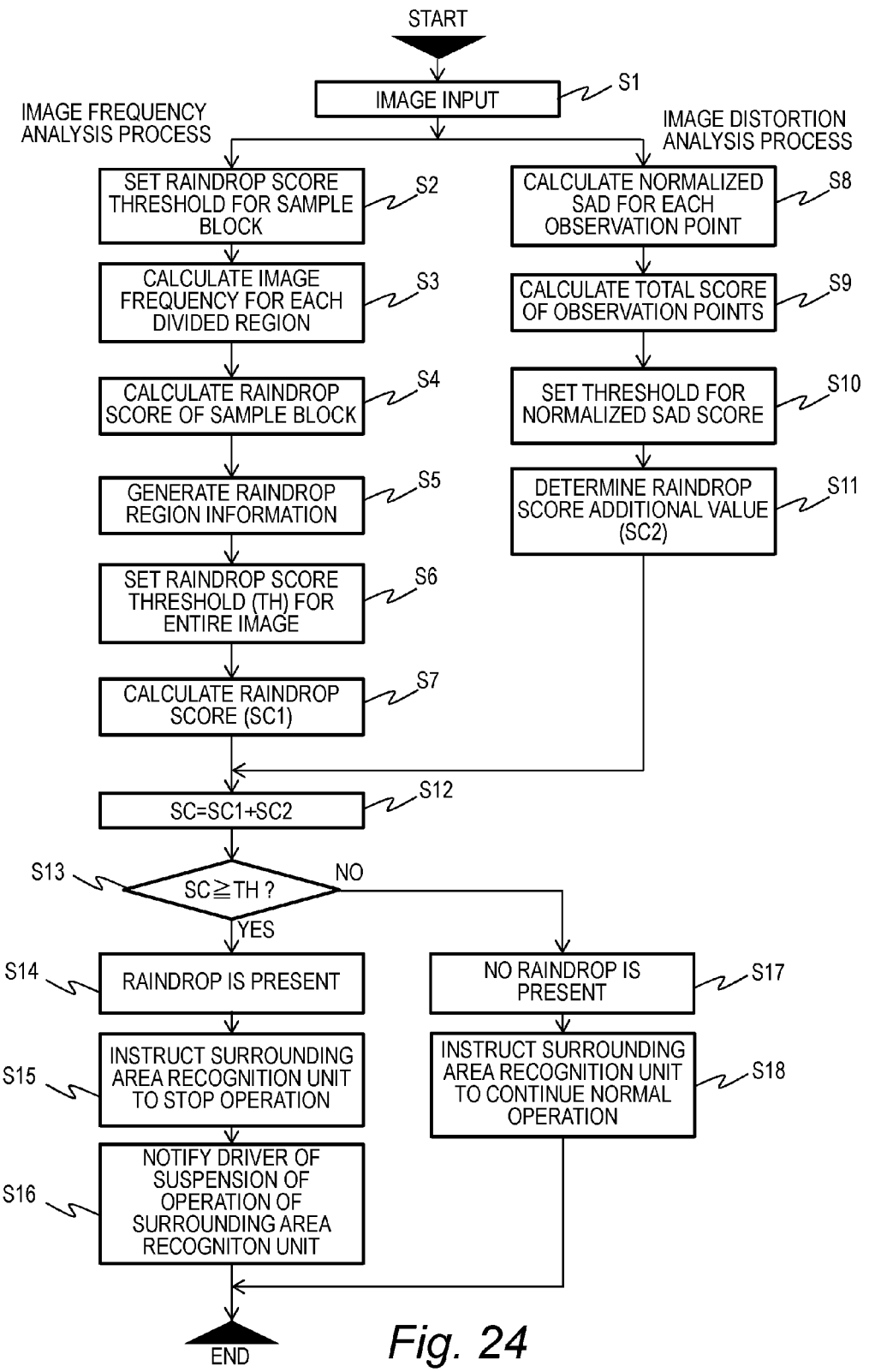
FIG. 24 is a flow chart illustrating an example of an operation of the outside recognition apparatus of Embodiment 6 of the present invention.

FIG. 24 is a flow chart illustrating an example of the operation of the outside recognition apparatus 100 of Embodiment 6 of the present invention.

FIG. 24 shows the operation of the outside recognition apparatus 100 shown in FIG. 23 as an example. First, when an image is received from the vehicle-mounted camera 111 (S1), the image frequency analysis process and the image distortion analysis process are conducted in parallel using the same input image.

In the image frequency analysis process, the raindrop score threshold of a sample block (see FIG. 8A) is set (S2). This threshold may be inputted by a user, or may be set by the raindrop detection unit 101 based on the past detection results. Next, the image frequency analysis unit 102 calculates the image frequency of each divided region (S3). Next, the first raindrop score calculation unit 103 calculates the raindrop score of each sample block (S4), and the raindrop region information generation unit 104 generates raindrop region information (S5). Next, the raindrop judgment unit 105 sets the raindrop score threshold TH for the entire unit (S6), and then calculates the raindrop score SC1 from the image frequency analysis process (S7).

In the image distortion process, the image distortion analysis unit 1600 calculates the normalized SAD for each observation point (S8). Then the third raindrop score calculation unit 1601 calculates the total score of the observation points based on the normalized SAD (S9), sets the threshold for the normalized SAD score (S10), and determines the raindrop score additional value SC2 of the image distortion analysis process (S11).

Next, the raindrop judgment unit 105 adds the raindrop score SC1 of the image frequency analysis process to the raindrop score additional value SC2 of the image distortion analysis process, thereby calculating the total score SC (S12). If the total score SC is equal to or greater than the raindrop score threshold TH (S13), the raindrop judgment unit 105 determines raindrops are present (S14). If the total score SC is smaller than the raindrop score threshold TH (S14), the raindrop judgment unit 105 determines that raindrops are not present (S17). The raindrop judgment unit 105 sends the determination results on the presence or absence of raindrops to the surrounding area recognition unit 106 as raindrop judgment information.

Upon receiving the judgment result indicating the presence of raindrops, the dirtiness detection unit 108 sends a FAIL signal to the surrounding area recognition unit 107, thereby causing the operation thereof to stop (S15), and notifies the driver of the suspension of the is operation of the surrounding area recognition unit 107 by displaying the information on the display 2302 or the like (S16). Upon receiving the judgment result indicating the absence of raindrops, the dirtiness detection unit 108 instructs the surrounding area recognition unit 107 to continue the normal operation (S18).

As described above, FIG. 24 shows an example of the operation of the outside recognition apparatus 100 of Embodiment 6 of the present invention, but the operation of the outside recognition apparatus 100 of Embodiment 4 may also be substantially the same as that shown in FIG. 24. The operation of the outside recognition apparatus 100 of Embodiments 1 and 2 may be substantially the same as that shown in FIG. 24 except that S8 to S12 are omitted. The operation of the outside recognition apparatus 100 of Embodiment 3 may be substantially the same as that shown in FIG. 24 except that: S8 to S12 are omitted; the same processes as S2 to S4 are conducted on larger divided regions shown in FIG. 13A; and S2 to S7 are conducted on smaller divided regions included in a divided region deemed to have raindrops as a results of the above-mentioned processes from S2 to S4.

Water droplets described above are an example of lens dirtiness, and in particular, an example of lens dirtiness having a high light transmittance. In addition to water droplets, typical lens dirtiness includes dirt, snow, or lens deposit, but these have lower light transmittance than water droplets. The lower the light transmittance of lens dirtiness is, the more significantly the frequency powers of a captured image reduce, and therefore, the raindrop detection method by the raindrop judgment unit 105 described above may also be applied to other lens dirtiness having a lower light transmittance than raindrops.

According to the respective embodiments of the present invention, by detecting lens dirtiness based on image frequency powers, instead of detecting edges of water droplets based on pixel values of an image captured by a camera, it is possible to accurately detect lens dirtiness having a high light transmittance such as water droplets.

The present invention is not limited to the above-described embodiments, and various modifications may be included. The respective embodiments above were described in detail to clarify the present invention, and shall not be interpreted as having all of the configurations described above. A part of the configuration of one embodiment may be replaced with a configuration of another embodiment, and the configuration of one embodiment may be added to the configuration of another embodiment. A part of the configuration of each embodiment may be combined with another configuration, omitted, or replaced with another configuration.

For example, the outside recognition apparatus 100 may combine the two-step lens dirtiness detection described in Embodiment 3 and the lens dirtiness detection based on the detection results of image distortion described in Embodiment 4. The outside recognition apparatus 100 of any one of Embodiments 1 to 5 may be connected to at least one of the LED 2300, the speaker 2301, the display 2302, the car navigation apparatus 2303, and the like described in Embodiment 6.

A part or all of the respective configurations, functions, processing units, processing means, and the like may be realized through hardware by designing those into an integrated circuit, for example. The respective configurations, functions, and the like may also be realized through software by having a processor read and run programs provided to realize the respective functions. The information such as programs, tables, and files for realizing the respective functions can be stored in a memory device such as a non-volatile semiconductor memory, hard disk drive, or SDD (solid state drive), or a computer-readable non-transitory data storage medium such as IC card, SD card, or DVD.

The figures show control lines and information lines considered necessary to explain the respective embodiments, but does not necessarily show all control lines and information lines included in an actual product to which the present invention is applied. It can be understood that in reality, almost all of the configurations are connected to each other.

What is claimed is:

1. An outside recognition apparatus configured to detect a raindrop on a lens of a camera, comprising:
   a control unit; and
   a memory coupled to the control unit,
   wherein the memory stores therein pixel value data of an image captured by the camera, and
   wherein the control unit is configured to:
   calculate image frequency powers of a plurality of frequency regions based on pixel values of a first region of a plurality of first regions of the image;
   determine whether each of the calculated image frequency powers of the plurality of frequency regions of the first region exceeds a predetermined first threshold;
   determine that the raindrop is in the first region if a number of the plurality of frequency regions in which the calculated image frequency powers does not exceed the first threshold value exceeds a predetermined second threshold;
   calculate image frequency powers based on pixel values of a plurality of second regions of the image each made of the plurality of the first regions, each of the plurality of second regions being smaller than the entire image;
   calculate image frequency powers based on pixel values of the plurality of first regions;
   determine presence or absence of the raindrop based on the calculated image frequency powers of the plurality of second regions and the calculated image frequency powers of the plurality of first regions; and
   output the determination that the raindrop is present or absent.

2. The outside recognition apparatus according to claim 1, wherein the control unit is further configured to:
   calculate the image frequency powers of the plurality of second regions before calculating the image frequency powers of the plurality of first regions;
   determine presence or absence of the raindrop based on the calculated image frequency powers of the plurality of first regions included in a number of the plurality of second regions determined to have the raindrop.

3. The outside recognition apparatus according to claim 2, wherein the calculated image frequency powers of the plurality of second regions are obtained through weighed calculation on an image frequency power of each of the plurality of second regions.

4. The outside recognition apparatus according to claim 3, wherein the control unit is further configured to:
   compare an image of at least one stationary subject in which a subject always appears with a template image captured in advance to detect image distortion of the at least one stationary subject; and
   determine presence or absence of the raindrop based the detected image distortion of the at least one stationary subject.

5. The outside recognition apparatus according to claim 4, wherein the control unit is further configured to:
   determine whether a normalized sum of absolute difference between the image of the at least one of the stationary subject and the template image exceeds a predetermined third threshold; and
   determine presence or absence of the raindrop based on a number of the plurality of first regions determined to have the raindrop, and that the normalized sum of absolute differences does not exceed the third threshold.

6. The outside recognition apparatus according to claim 1, wherein the control unit is further configured to:
   determine whether a number of the plurality of first regions determined to have the raindrop exceeds a predetermined fourth threshold; and
   determine presence of the raindrop if the number of the plurality of first regions exceeds the predetermined fourth threshold.

7. The outside recognition apparatus according to claim 1, wherein the control unit is further configured to:
   determine whether a number of the plurality of first regions determined to have the raindrop in each of a plurality of third regions, each third region being smaller than the entire image and greater than the first region, exceeds a predetermined fifth threshold; and
   determine that the raindrop is a third region of the plurality of third regions if the number of the plurality of first regions determined to have the raindrop exceeds the fifth threshold.

8. The outside recognition apparatus according to claim 1, further comprising:
   the camera; and
   at least one infrared light source configured to radiate infrared light to the lens of the camera in the case where an image capturing environment of the camera meets predetermined conditions.

9. The outside recognition apparatus according to claim 1, further comprising at least one of a display device and an audio output device, the display device being configured to output visual information indicating the determination that the raindrop is present or absent, the audio output device being configured to output audio information indicating the determination that the raindrop is present or absent.

10. A method for detecting a raindrop on a lens of a camera using an outside recognition apparatus that includes a control unit, and a memory coupled to the control unit, the memory storing therein pixel value data of an image captured by the camera, the method comprising:

calculating image frequency powers of a plurality of frequency regions based on pixel values of a first region of a plurality of first regions of the image;

determining whether each of the calculated image frequency powers of the plurality of frequency regions of the first region exceeds a predetermined first threshold;

determining that the raindrop is in the first region if a number of the plurality of frequency regions in which the calculated image frequency powers does not exceed the first threshold value exceeds a predetermined second threshold;

calculating image frequency powers based on pixel values of a plurality of second regions of the image each made of the plurality of the first regions, each of the plurality of second regions being smaller than the entire image;

calculating image frequency powers based on pixel values of the plurality of first regions;

determining presence or absence of the raindrop based on the calculated image frequency powers of the plurality of second regions and the calculated image frequency powers of the plurality of first regions; and determining that the raindrop is present or absent.

* * * * *